(12) United States Patent
Li et al.

(10) Patent No.: US 9,999,860 B2
(45) Date of Patent: Jun. 19, 2018

(54) CHANNELED ARTICLES AND METHODS FOR THEIR MANUFACTURE

(71) Applicant: Curtin University of Technology, Bentley (AU)

(72) Inventors: Chun-Zhu Li, Cottesloe (AU); Dehua Dong, Willetton (AU); Xin Shao, Bentley (AU); Gordon Parkinson, Rossmoyne (AU)

(73) Assignee: CURTIN UNIVERSITY OF TECHNOLOGY, Bentley (AU)

( * ) Notice: Subject to any disclaimer, the term of this patent is extended or adjusted under 35 U.S.C. 154(b) by 109 days.

(21) Appl. No.: 14/784,810

(22) PCT Filed: Apr. 24, 2014

(86) PCT No.: PCT/AU2014/000468
§ 371 (c)(1),
(2) Date: Oct. 15, 2015

(87) PCT Pub. No.: WO2014/172752
PCT Pub. Date: Oct. 30, 2014

(65) Prior Publication Data
US 2016/0051941 A1 Feb. 25, 2016

(30) Foreign Application Priority Data
Apr. 26, 2013 (AU) .............................. 2013901454

(51) Int. Cl.
*B01D 53/22* (2006.01)
*B01D 71/02* (2006.01)
(Continued)

(52) U.S. Cl.
CPC ......... *B01D 71/024* (2013.01); *B01D 53/228* (2013.01); *B01D 67/0041* (2013.01);
(Continued)

(58) Field of Classification Search
CPC B01D 67/0046; B01D 71/024; B01D 53/228; B01D 69/06; B01D 53/22;
(Continued)

(56) References Cited

U.S. PATENT DOCUMENTS 5,156,780 A * 10/1992 Kenigsberg ........ B01D 67/0088
210/500.21
5,158,584 A * 10/1992 Tamura .................. B01D 53/22
128/205.11
(Continued)

FOREIGN PATENT DOCUMENTS

CN 101115695 A 1/2008
EP 2 604 329 6/2013
(Continued)

OTHER PUBLICATIONS

PCT/AU2014/000468 International Search Report dated Jul. 1, 2014 (5 pages).
(Continued)

*Primary Examiner* — Anthony Shumate
(74) *Attorney, Agent, or Firm* — Brinks Gilson & Lione

(57) ABSTRACT

An article with a body having spaced channels created at a surface of the body and extending into the body, wherein the channels are located at controlled spaced locations. The channeled or microchanneled articles may be in the form of channeled or microchanneled membranes or otherwise. Methods of manufacturing channeled articles and uses of the channeled articles are described.

20 Claims, 14 Drawing Sheets

(51) Int. Cl.

| | |
|---|---|
| *B01D 67/00* | (2006.01) |
| *B01D 69/06* | (2006.01) |
| *C04B 35/01* | (2006.01) |
| *C04B 35/26* | (2006.01) |
| *C04B 35/624* | (2006.01) |
| *C04B 35/626* | (2006.01) |
| *C04B 35/634* | (2006.01) |
| *C04B 35/622* | (2006.01) |
| *C04B 38/00* | (2006.01) |
| *C25B 13/04* | (2006.01) |
| *H01M 8/1246* | (2016.01) |
| *B29L 31/00* | (2006.01) |
| *C04B 111/00* | (2006.01) |

(52) U.S. Cl.
CPC ......... *B01D 67/0046* (2013.01); *B01D 69/06* (2013.01); *C04B 35/01* (2013.01); *C04B 35/26* (2013.01); *C04B 35/622* (2013.01); *C04B 35/624* (2013.01); *C04B 35/6264* (2013.01); *C04B 35/62625* (2013.01); *C04B 35/634* (2013.01); *C04B 38/0003* (2013.01); *C25B 13/04* (2013.01); *B29L 2031/755* (2013.01); *C04B 2111/0081* (2013.01); *C04B 2111/00801* (2013.01); *C04B 2111/00853* (2013.01); *C04B 2235/3213* (2013.01); *C04B 2235/3227* (2013.01); *C04B 2235/3272* (2013.01); *C04B 2235/3275* (2013.01); *C04B 2235/5409* (2013.01); *C04B 2235/6028* (2013.01); *H01M 8/1246* (2013.01); *Y02E 60/525* (2013.01); *Y02P 70/56* (2015.11)

(58) Field of Classification Search
CPC ............ B01D 67/0041; C04B 38/0003; C04B 2235/3213; C04B 35/6264; C04B 35/622; C04B 35/634; C04B 2235/3227; C04B 2111/00853; C04B 2235/6028; C04B 2235/3275; C04B 35/62625; C04B 35/624; C04B 35/01; C04B 2235/3272; C04B 35/26; C04B 2111/0081; C04B 2111/00801; C04B 2235/5409; C25B 13/04; Y02P 70/56; B29L 2031/755
See application file for complete search history.

(56) References Cited

U.S. PATENT DOCUMENTS

| | | | | |
|---|---|---|---|---|
| 5,955,175 | A * | 9/1999 | Culler | F41H 3/00 135/93 |
| 6,368,383 | B1 | 4/2002 | Virkar | |
| 6,620,356 | B1 * | 9/2003 | Wong | A61L 27/56 210/490 |
| 8,114,478 | B1 | 2/2012 | Koreltz | |
| 9,446,355 | B2 * | 9/2016 | Larue | B01D 69/02 |
| 9,561,473 | B2 * | 2/2017 | Singh | B01D 69/08 |
| 2002/0127387 | A1 * | 9/2002 | Sale | B01D 67/0018 428/315.5 |
| 2003/0034295 | A1 * | 2/2003 | Strano | B01D 67/0067 210/483 |
| 2003/0121841 | A1 | 7/2003 | Harttig | |
| 2003/0230819 | A1 * | 12/2003 | Park | A61L 31/16 264/4 |
| 2004/0028875 | A1 * | 2/2004 | Van Rijn | A61L 27/50 428/98 |
| 2006/0119015 | A1 * | 6/2006 | Wehrspohn | B01D 67/0069 264/627 |
| 2008/0272345 | A1 | 11/2008 | Werth et al. | |
| 2009/0087491 | A1 * | 4/2009 | Boury | A61K 9/1617 424/489 |
| 2009/0126567 | A1 * | 5/2009 | Liu | B01D 53/228 95/45 |
| 2009/0152763 | A1 * | 6/2009 | Liu | B01D 67/0079 264/216 |
| 2010/0044314 | A1 * | 2/2010 | Zhang | B01D 71/68 210/646 |
| 2010/0159214 | A1 | 6/2010 | Hasegawa | |
| 2011/0111122 | A1 * | 5/2011 | Mues | H01M 2/145 427/209 |
| 2011/0129924 | A1 * | 6/2011 | Ying | A61L 27/56 435/396 |
| 2011/0240550 | A1 * | 10/2011 | Moore | B01D 67/0011 210/490 |
| 2012/0060693 | A1 * | 3/2012 | Sasaki | B01D 46/543 96/139 |
| 2013/0000488 | A1 * | 1/2013 | Kratzer | B01D 53/228 96/10 |
| 2013/0146539 | A1 * | 6/2013 | Larue | B01D 61/18 210/650 |
| 2014/0167329 | A1 * | 6/2014 | L'Abee | D01D 5/0007 264/465 |
| 2015/0152136 | A1 * | 6/2015 | Carpenter | B01D 67/0009 530/414 |
| 2015/0246319 | A1 * | 9/2015 | Furuyama | B01D 39/1692 55/486 |
| 2015/0246322 | A1 * | 9/2015 | Larue | B01D 69/02 210/650 |
| 2015/0246323 | A1 * | 9/2015 | Singh | B01D 69/06 210/650 |
| 2015/0246327 | A1 * | 9/2015 | Nichols | G05B 15/02 210/490 |
| 2015/0258500 | A1 * | 9/2015 | Cho | B29C 47/0057 210/500.36 |

FOREIGN PATENT DOCUMENTS

| | | |
|---|---|---|
| JP | 2001-514152 | 9/2001 |
| JP | 2003-534906 | 11/2003 |
| JP | 2005-169344 | 6/2005 |
| WO | WO 99/11582 | 3/1999 |
| WO | WO 01/93987 | 12/2001 |
| WO | WO 02/43937 | 6/2002 |

OTHER PUBLICATIONS

Notification of First Refusal (11 pages including English translation) dated Dec. 26, 2017 from corresponding JP Application No. 2016509234.

Asadi, A.A., et al., "Preparation and Oxygen Permeation of $La_{0.6}Sr_{0.4}Co_{0.2}Fe_{0.8}O_3$-(LSCF) Perovskite-Type Membranes: Experimental Study and Mathematical Modeling", *I&EC Research, Industrial and Engineering Chemistry Research*, vol. 51, No. 7, 2012. pp. 3069-3080.

Guillen, G. R. et al., "Preparation and Characterization of Membranes Formed by Nonsolvent Induced Phase Separation: A Revie", *I&EC Research, Industrial and Engineering Chemistry Research*, vol. 50, 2011, pp. 3798-3817.

Lui, N. et al., "Honeycomb-Structured Perovskite Hollow Fibre Membranes With Ultra-Thin Densified Layer for Oxygen Separation", *Separation and Purification Technology*, vol. 80, 2011, pp. 396-401.

Shao, X, et al., "Microstructure Control of Oxygen Permeation Membranes With Templated Microchannels", *The Journal of Materials Chemistry A*, No. 2, 2014, pp. 410-417.

Tan, X et al., "Effects of Sintering on the Properties of $La_{0.6}Sr_{0.4}Co_{0.2}Fe_{0.8}O_3$-Perovskite Hollow Fiber Membranes", *I&EC Research, Industrial and Engineering Chemistry Research*, vol. 49, No. 6, 2010, pp. 2895-2901.

Wang, Z. et al., "Improvement of the Oxygen Permeation Through Perovskite Hollow Fibre Membranes by Surface Acid-Modification", *Journal of Membrane Science*, vol. 345, Issues 1-2, Dec. 2009, pp. 65-73.

(56) References Cited

OTHER PUBLICATIONS

Zeng, P. et al., "Significant Effects of Sintering Temperature on the Performance of $La_{0.6}Sr_{0.4}Co_{0.2}Fe_{0.8}O_3$-Oxygen Selective Membranes", *Journal of Membrane Science*, vol. 302, 2007, pp. 171-179.
Zou, Y. et al., "Sintering and Oxygen Permeation Studies of $La_{0.6}Sr_{0.4}Co_{0.2}Fe_{0.8}O_3$-Ceramic Membranes With Improved Purity", *Journal of the European Ceramic Society*, vol. 31, 2011, pp. 2931-2938.
Zydorczak, B. et al., "Fabrication of Ultrathin $La_{0.6}Sr_{0.4}Co_{0.2}Fe_{0.8}O_3$-Hollow Fibre Membranes for Oxygen Permeation", *Chemical Engineering Science*, vol. 64, 2009, pp. 4383-4388.

* cited by examiner

CHANNELED ARTICLES AND METHODS FOR THEIR MANUFACTURE

This application claims priority to International Application No. PCT/AU2014/000468 filed Apr. 24, 2014 and to Australian Application No. 2013901454 filed Apr. 26, 2013; the entire contents of each are incorporated herein by reference.

FIELD

The present invention generally relates to channeled articles, typically microchanneled articles, and a method of manufacturing channeled articles. The channeled or microchanneled articles may be in the form of channeled or microchanneled membranes or otherwise.

BACKGROUND

Ion Transport Membranes (ITMs) are ceramic membranes that are useful in gas separation such as the production of oxygen and hydrogen gases from gas streams. In ITMs, the separation of gases is based on ion conduction, where particular gases may be selectively transported across the ceramic material in the form of ionic flux. Ceramic membranes may also enable separations based on mixed ionic and electronic conduction or mixed proton-electron conductivity. Most oxygen ion transport membrane materials only conduct oxygen at temperatures above 700° C. (973 K), but despite the need for the membrane to be heated, the energy required is significantly less than for other forms of oxygen production. Accordingly, ITMs have attracted considerable research interest because they are able to separate oxygen from air and produce oxygen at lower costs than those incurred using the conventional cryogenic distillation process.

One problem associated with the use of ITMs is that oxygen permeation through conventional ITMs is slow, which limits the rate of the overall oxygen separation process. Oxygen exchange at the membrane surface and bulk diffusion within the dense membrane are considered to be the major rate-limiting steps of oxygen permeation through ITMs, and overall permeation is often jointly controlled by both processes.

In seeking to improve oxygen permeation through ITMs, some research has concentrated on modifying membrane surfaces in order to improve the oxygen surface exchange by applying catalysts. However, the absolute improvement of oxygen permeation is limited by the bulk diffusion resistance.

During the bulk diffusion-limiting process, oxygen permeation flux (OPF, $J_{O_2}$) is inversely proportional to membrane thickness. Accordingly, some improvement in oxygen permeation flux can be achieved by reducing membrane thickness. However, there are limitations on the thickness of the membrane in order to ensure adequate mechanical strength. For example, disc membranes, such as those used in laboratory experiments, typically have a thickness of about 1 mm to ensure adequate mechanical strength, with the consequence that there is a long oxygen bulk diffusion distance.

Ceramic membranes with thin dense layers (which are less than 100 µm thick) that are supported on porous substrates have been developed in an effort to improve OPF by reducing the oxygen ion diffusion distance. In the design of supported membranes, the match of thermal expansion and chemical compatibility between the dense layer and the porous support needs to be carefully considered because of the high sintering and operating temperatures used (up to 1250° C.). Furthermore, the asymmetric membranes need to be sintered at high temperatures to obtain the dense layers, leading to a porous support with low porosity and isolated pores causing gas diffusion resistance in the supports. In addition, the low porosity of such supports makes it difficult to deposit catalysts for oxygen surface exchange at the interface between porous supports and dense layers.

Tubular membranes prepared by paste extrusion also suffer from a thick dense layer similar to that observed in plate membranes. However, hollow fibre membranes having outer diameters of less than 3 mm are attractive as it is possible to achieve a membrane thickness of less than 500 µm. Hollow fibre membranes are prepared by a phase inversion process which involves spinning the ceramic slurry into coagulants. Phase inversion starts from both sides of the membrane wall, caused by the internal and external coagulants. The resulting hollow fibre membrane structure consists of skin layers on two sides and a central layer sandwiched by two groups of finger-like pores.

After sintering, the central layer and the two skin layers form dense layers (i.e. three dense layers are formed), across which oxygen separation via ion transport is performed. However, the porous structure having multiple dense layers is unfavourable for oxygen permeation because permeation through the entire membrane thickness will involve oxygen exchange processes at each of the three dense layer surfaces before oxygen permeation across the hollow fibre membrane is complete. Accordingly, this limits the rate of the overall oxygen permeation process.

Two methods have been proposed to tackle the problems associated with oxygen permeation across hollow fibre membranes. In one method, acids are used to erode the skin layers and open the finger-like pores, leaving only one densified layer in the centre of the walls. Alternatively, a certain amount of solvent is added to the internal coagulant to prevent the formation of an inner skin layer or to dissolve any newly-formed skin layer. Nevertheless, both methods suffer from complicated processes for preparation of the hollow fibre membranes and/or low mechanical strength due to ultra-thin fibre walls combined with high porosity. While it is difficult to compare the performance of different types of membranes (e.g. plate versus hollow fibre) due to the different dimensions, hollow fibre membranes can obtain relatively high oxygen permeation flux (OPF) as a result of having a very thin wall. However, despite their performance, hollow fibre membranes have limited applications as they are fragile and can easily break. In addition, hollow fibre membranes cannot be readily scaled up to commercial applications, and as the hollow fibres are far from straight, they cannot be packed very densely. Accordingly, it is very difficult to assemble these fibres into, for example, a reactor in practical applications.

ITMs are also used to selectively transport ions other than $O^{2-}$, for example $H^+$ and $Na^+$. Conventional separation membranes that rely on narrow pore sizes to achieve selective permeation of species can advantageously be supported on appropriate microchanneled articles.

Ceramic materials such as those described above have the potential for application in articles other than ceramic membranes. For example, ceramic articles may be configured for use in micro reactors. New developments in this field may identify further applications for ceramic articles that have not yet been identified.

There is a therefore a need for alternative or improved ceramic articles, such as ceramic membranes, including methods of fabricating the ceramic membranes.

SUMMARY

In developing new and alternative methods for fabricating improved channeled articles, with particular reference to microchanneled membranes for oxygen separation, the present inventors have identified a new simplified method that enables the manufacture of channeled articles having improved structures and/or performance.

In one embodiment, there is provided a method of manufacturing an article containing spaced channels including the steps of:
 bringing a template having spaced openings into contact with a solution comprising a first solvent and a polymer which is soluble in the first solvent;
 introducing a second solvent into the solution through the openings of the template to cause phase inversion of the solution and form an article containing spaced channels extending from a surface of the article into a body of the article.

The second solvent may be any solvent that is miscible with the first solvent but cannot dissolve the polymer, to allow phase inversion to occur. Preferably, the second solvent is water or comprises water.

The solution comprising a first solvent and a polymer may further comprise a particulate material. In some embodiments, the particulate material is insoluble in the solution (i.e. the solution of the first solvent and polymer), and the combination of the first solvent, the polymer and the particulate material forms a slurry. For example, in the formation of a ceramic article, the solution comprises a first solvent, a polymer and a ceramic material. The ceramic material may be insoluble in the solution, and the combination of the first solvent, the polymer and the ceramic material may be referred to as a "ceramic slurry".

The applicants have surprisingly found that, by using a template when performing a phase inversion during the production of an article, such as a ceramic article or a ceramic membrane, it is possible to control or direct formation of the channels within the article. As an example, when a template is used containing evenly spaced openings of equal size, the channels formed in the template are similarly evenly spaced apart, and have controlled channel dimensions. This provides a very useful and simple technique for the very precise production of articles containing spaced channels of controlled geometry, which in turn gives rise to many advantages in the use of the article. These advantages and additional properties are described in further detail below.

In a typical process, the template is located just below a surface of the solution comprising the first solvent and the polymer. The template is typically positioned in this location prior to introducing the second solvent, in which the polymer is not soluble. After phase inversion, the template is usually removed, leaving the channels exposed or open. Although the article can be sold in this state without any further processing, the method may further comprise an additional step in which the article is dried, cured, heated or sintered. For example, following phase inversion in embodiments where the solution comprises a ceramic material, the resulting ceramic article is in the "green state", and it is usual for the method for the manufacture of the ceramic article to further comprise the step of sintering the ceramic article to form a sintered ceramic article.

The present invention also provides a method of manufacturing an article containing a body and spaced channels including the step of:
 printing, on a 3D printer, successive layers of an ink comprising a polymer and optionally one or both of a solvent and a particulate material, to form said article with the spaced channels located at controlled spaced locations extending from a surface of the article into the body of the article.

The ink may in some instances comprise molten polymer, in which case the solvent is not required, or the ink may comprise polymer and a solvent for the polymer. The ink used to form the article may comprise polymer and no particulate material, so as to generate a polymer article of the required geometry, or alternatively, the ink may comprise polymer and particulate material, and optionally solvent, suitable for the formation of a ceramic article. The article may be in the form of a membrane.

3D printing is another way to manufacture articles of the present application, with controlled or directed channel geometry. Channels can be formed through this technique so as to be evenly spaced apart, and with controlled channel dimensions. Through the formation of articles using the templated phase inversion process, it was found that membranes based on such controlled geometry, produced by the applicant for the first time, provide a range of advances over prior art membranes. With this understanding, it was realised that articles of the required physical structure could be produced by other techniques such as 3D printing.

It follows that the present invention also provides channeled articles, typically microchanneled articles, which are manufactured by the methods as described above. The channeled articles may take the form of a channeled membrane, or may take another suitable form. The channeled articles or channeled membranes may, for example, be ceramic articles or membranes.

The present invention also provides an article comprising a body having spaced channels created at a surface of the body and extending into the body, wherein the channels are located at controlled spaced locations.

The technology described in this application enables the formation of articles containing channels, specifically microchannels that are positioned precisely according to the pattern set by the user creating the article.

Accordingly, using a template or any similar technique (e.g. 3D printing) that controls or directs the formation of the channels, it is possible for the channels to be substantially uniformly spaced across the surface of the article. In some embodiments, it is possible to form an article containing channels of substantially uniform diameter or cross-section extending into the body or along the length of each channel. The manufacturing process can also be performed in a way that ensures that the channels produced are closed channels which terminate within the body of the article. Through control of the manufacturing conditions, the channels may be formed as substantially straight channels or otherwise as inclined or curved channels.

The article may be in the form of a membrane, or the article may be in another form.

In one embodiment, the body of the article is substantially planar. In another embodiment, the article is in the form of a membrane and has a plate-like configuration.

In yet another embodiment, the article is in the form of a membrane and has a tubular configuration. As an example, such tubular or other configurations can be achieved by forming the article to a green state by the techniques described herein, manipulating the article in the green state to change the shape of the article, and curing or sintering the article. The article could be formed into a substantially planar form in the green state, and changed or manipulated into a tubular shape, prior to the curing or sintering step. In the alternative, if formed by 3D printing, it is possible to generate the article from the outset in any desired configuration.

The article containing spaced channels has a number of advantageous properties, including improved performance (such as, for example, high ion transfer flux, gas diffusion rate and catalytic activity) and/or improved resistance to thermal shock. In one embodiment, the article has improved oxygen permeation flux (OPF). In another embodiment, the OPF of the article is improved by a factor of up to 7 compared with conventional dense membranes of comparable thickness. In a further embodiment, the article (or, specifically, the membrane) has an oxygen permeation flux within the range of 2-12 ml.cm$^{-2}$.min$^{-1}$ at 1050° C.

Additional details concerning the microchanneled articles, their properties and their manufacture are described in further detail below.

BRIEF DESCRIPTION OF THE DRAWINGS

Preferred embodiments of the present invention will now be further described and illustrated, by way of example only, with reference to the accompanying drawings in which.

DETAILED DESCRIPTION

Figure 1A:
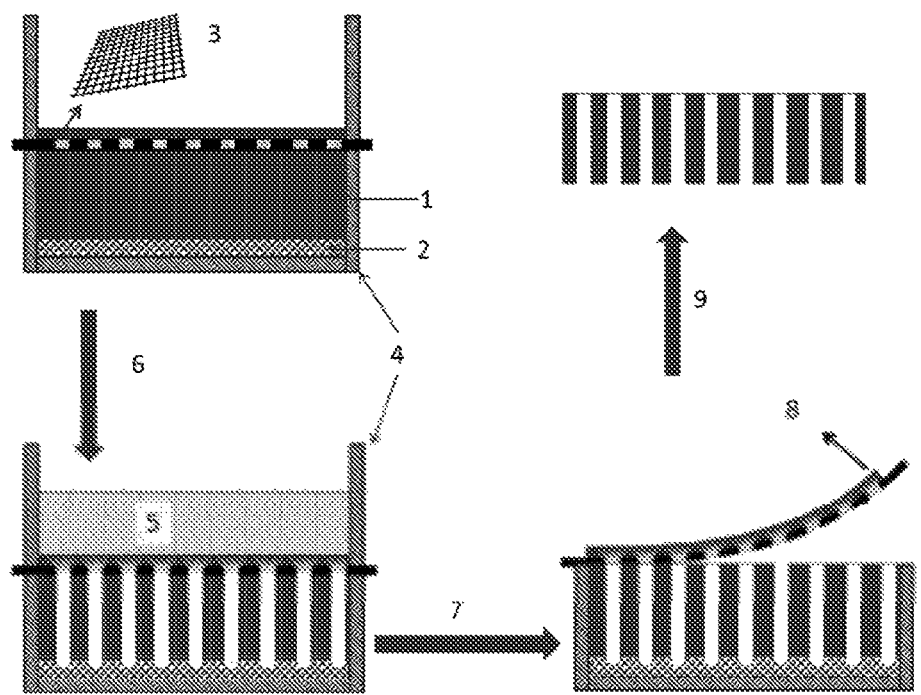
FIG. 1 is a schematic representation of two variations on the preparation of an article in which the channels extend through the body and are open at opposite ends using a template-assisted phase-inversion process. The numerals shown in FIG. 1a represent the following: 1 is slurry 1; 2 is slurry 2; 3 is a stainless steel mesh; 4 is a mould; 5 is water; 6 is the step of phase inversion; 7 is the step of removing a skin layer; 8 shows lifting off the mesh; and 9 is the step of demoulding and sintering. The numerals shown in FIG. 1b represent the following: 1 is Slurry; 2 is a stainless steel mesh; 3 is a mould; 4 is water; 5 is the step of phase inversion; 6 is the step of removing the skin layers; 7 and 8 show lifting off the mesh; 9 is the step of demoulding and sintering.

The channeled articles, membranes, devices, methods of manufacture and uses thereof, according to particular embodiments of the invention are described below. The present invention relates, in particular, to microchanneled articles, membranes, devices, methods of manufacture and uses thereof.

The inventors have developed a method of making an article containing spaced channels, such as a membrane, using phase inversion. In this method, a template having spaced openings is brought into contact with a solution comprising a first solvent and a polymer which is soluble in the first solvent. A second solvent is directed in a controlled pattern into the solution so as to create spaced channels extending from a surface of the article into a body of the article. The second solvent is miscible with the first solvent but cannot dissolve the polymer. The second solvent is directed into the solution comprising the first solvent and the polymer through the openings of the template to cause phase inversion of the solution and form an article containing spaced channels extending from a surface of the article into a body of the article. Numerous small pores start growing after the skin layer that forms at the top surface, and the template has a significant role in combining small pores into large pores, thereby templating microchannels when the small pores pass through the template apertures during phase inversion. The method has advantages over the fabrication processes used for conventional supported membranes. For example, the method can form the article in a single step. Further, the resulting articles containing spaced channels, may provide improved performance and/or improved resistance to thermal shock.

The term "article" is used in the specification to refer to an object containing spaced channels. The article may have any shape or configuration that is suitable for its application. The article may be provided in a shape or configuration that is suitable for application in batteries (e.g. sodium sulphur), in thermal to electric converters (such as alkali metal thermal to electric converters, also known as sodium heat engines (SHE)), in fuel cells (such as molten-carbonate fuel cells), solid oxide fuel cells (SOFC) and solid oxide electrolysis cells (SOEC), or in micro reactors. The article may also be provided in a shape or configuration that is suitable for application in gas separation, such as in the production of oxygen and hydrogen gases from gas streams, in oxygen or hydrogen separation or in applications such as natural gas conversion and hydrogen/synthesis gas production from fossil fuels and renewable energy, the partial reduction of carbon dioxide to carbon monoxide or the catalytic partial oxidation of methane to syngas. As one example, the article may be formed with a substantially planar body.

A membrane containing spaced channels is a specific example of a form of article. Other forms that the article may take include microreactor plates, in which the microreactions may be conducted in the channels contained in the article. The form of the article will be suitable for applications which make use of the ordered microchannels. As the article may be formed having an integrated dense layer and porous layer, or without a dense layer at all, the resulting article may have an ordered porous structure, and could be used as a support for membranes (as one example, the ordered porous structure could find application as a support for a reverse osmosis membrane or an (ultra)filtration membrane).

The article containing spaced channels may be manufactured by a method involving phase inversion, in which the solution comprising the first solvent and the polymer is solidified on addition of the second solvent to form the article. The solution comprising a first solvent and a polymer may further comprise a particulate material. In some embodiments, the particulate material is insoluble in the solution, and the combination of the first solvent, the polymer and the particulate material forms a slurry. The material used to form the article will, in part, determine the properties of the article. If no particulate matter is present a polymeric article is produced, or if a particulate material is present an article comprising the particulate material will be produced. For example, if a ceramic material is used in the process, the resulting ceramic article may, for example, be used in gas separation applications.

The article that is produced by phase inversion may be sold in this state without any further processing. In some embodiments, the method may further comprise an additional step of heat treatment. Subsequent heat treatment, such as drying, heating, curing or sintering will convert the article into a robust structure. For example, after phase inversion, the resulting article may be referred to as a "green" article, which after sintering, is converted to a sintered ceramic article. It will be appreciated that the term article encompasses the article before and after the heat treatment step.

The term "membrane" is used in the specification to refer to articles in the form of membranes that have permeability to at least one species, such as a chemical or ion species, across the thickness of the article. The membrane may be a sheet-like structure comprised of a ceramic material, or it may be of any other suitable structure.

The membrane may be a selective separation barrier for one or several species or components in a mixture. These components are separated due to their different permeability, or the rate at which each component traverses the membrane. The relative rate at which each component permeates the membrane determines the selectivity of the membrane.

The material used to form the membrane will, in part, determine the properties of the membrane. If no particulate matter is present a polymeric article is produced, or if a particulate material is present an article comprising the particulate material will be produced. For example, if a ceramic material is used in the process, the resulting ceramic membrane may, for example, be used for the selective separation of particular gases (such as oxygen or hydrogen) from gas streams. The separation of gases is based on ion conduction, where a particular gas or gases are selectively transported across the ceramic membrane in the form of ionic flux. The separation may also be based on mixed ionic and electronic conduction or mixed proton-electron conductivity.

The structure of the membrane may take various forms, for example, the membrane may be formed as a plate-like configuration or structure, formed with a substantially planar body or may have a tubular configuration. In some embodiments, it is important to maintain consistency of strength and function across the membrane structures, and that the structure is highly uniform, preferably without holes or voids in the membrane other than the channels. In particular, where the membrane is intended to be used in separation applications such as the selective separation of gases, holes or cracks in the membrane would let through species other than the selected species that is to be transported across the membrane. However, it will be appreciated that avoiding holes or voids is not necessary where the membrane is intended for certain applications, such as where the article or membrane is used to support electrodes, in SOFCs and SOECs, or conventional (porous) membranes (for example, the article where the microchannels are open at both ends). In other embodiments, membranes are fabricated into structures that are capable of operating at high temperatures, typically about 700 to 1000° C. In particular, where the membrane is made of a ceramic material or is made with metal or carbonaceous slurries, the membrane may be suitable for use at high temperatures.

In some embodiments, the membranes are made relatively thin to reduce the distance across which the gas or ion must be transported (the bulk diffusion distance), while maintaining adequate mechanical strength. The thickness of the membrane may be within the range of between 100 µm and 5000 µm, 100 µm and 3000 µm, 100 µm and 2000 µm, 100 µm and 1000 µm, 100 µm and 500 µm or 100 µm and 200 µm., or preferably about 100-1000 µm. As an example, plate-like membranes, such as disc membranes will typically have a thickness of about 1 mm in order to ensure they have adequate mechanical strength.

The membrane may be manufactured by a method involving phase inversion, in which the solution comprising a first solvent and a polymer is solidified to form the membrane. The membrane that is produced by phase inversion may be sold in this state without any further processing. In some embodiments, the method may further comprise an additional step of heat treatment, such as drying, curing, heating or sintering. It will be appreciated that the term membrane encompasses the membrane before and after the heat treatment step.

The term "porosity" may be used to refer to the porosity of the material that forms the article (which will herein be referred to as the "microporosity"), or may be used to refer to the degree or extent of channel formation in the article or membrane (which will herein be referred to as the "article porosity" or the "membrane porosity"). The microporosity will be determined by membrane preparation parameters and therefore the channel structure. In one embodiment, the article porosity may be up to 50%. In another embodiment, the membrane porosity may be between 0 and 50%, preferably, the membrane porosity is between 20 to 40%.

Conventional ITMs are configured such that they comprise a dense layer attached to a porous support layer. However, in some embodiments, the membranes of the present invention have an integral construction in which the dense layer and the support layer are integral and are made of the same material. This configuration is advantageous when compared with conventional membranes, as for conventional membranes to obtain similar properties to the membranes of the present invention, such as oxygen permeation flux values, the support layer must have a significantly higher article porosity (for example, above 50% to about 60%) which makes the support part of the membrane in the conventional membrane intrinsically weaker, and the overall mechanical strength of the conventional membrane is reduced.

In some embodiments, the articles or membranes of the present invention have improved resistance to thermal shock compared to conventional articles or membranes. Expressed another way, the ceramic membranes of such embodiments have greater resistance to thermal shock compared to prior art ceramic membranes.

In the method of the present invention, the phase inversion process can be used by combining a solution comprising first solvent and a polymer with the second solvent to produce an article comprising the polymer. However, it will be appreciated that additional components may be added to the solution to produce an article comprising that additional component. In some embodiments, the particulate material is insoluble in the solution, and the combination of the first solvent, the polymer and the particulate material forms a slurry. By including the particulate material in the phase inversion process, the process can be used to prepare an article comprising that particulate material. The nature of the particulate material used to form the article will, in part, determine the properties of the article. For example, if a ceramic material is used in the process, the resulting ceramic article may, for example, be used in gas separation applications.

The term "particulate material" is used in the specification to refer to an additional component which may be added to the solution comprising a first solvent and a polymer to produce an article comprising the particulate material. In some embodiments, the particulate material is insoluble in the solution, and the combination of the first solvent, the polymer and the particulate material forms a slurry. The particulate material used to form the articles is provided by commercially available powders of the required composition. The powders can be subsequently treated to achieve the necessary physical powder characteristics to enable good dispersion which is an important parameter for achieving uniformity in the resulting articles. Further processing steps or treatments of the commercially available powder may be performed to achieve the necessary physical powder characteristics (for example, milling to obtain a suitable particle size, drying, and addition of other additives). In some embodiments, the particulate material may be a material that is selected for its properties and suitability for certain applications. For example, the particulate material may be selected because it has high conductivity, high mechanical strength, or high catalytic activity for gaseous reactions. The particulate material may be comprised of metal materials, ceramic materials, or metal-ceramic composites, or carbonaceous materials. In one example, if the particulate material selected is a conductive particulate material, the resulting article may be used in applications such as ion conduction or as an electrode. In one example, if the particulate material selected has no conductivity, the resulting article may find application as a membrane or catalyst support.

The term "ceramic material" or variations such as "particulate ceramic material" are used in the specification to refer to the well known class of ceramic materials. During manufacture, the ceramic material is prepared into particulate form for preparation into the desired shape of the ceramic article to be produced. The ceramic material used to form the ceramic articles is provided by commercially available ceramic powders of the required composition. The powders can be subsequently treated to achieve the necessary physical powder characteristics to enable good dispersion which is an important parameter for achieving uniformity in the resulting ceramic articles. Further processing steps or treatments of the commercially available powder may be performed to achieve the necessary physical powder characteristics (for example, milling to obtain a suitable particle size, drying, and addition of other additives). In some embodiments, the ceramic materials may be those ceramic materials having selective gas or ion transport capabilities.

The ceramic material may be comprised of metal oxides or mixed-metal oxides. Examples of suitable metal oxides include perovskites, fluorites, beta alumina ceramics and mixtures thereof. Mixed ceramic materials may also be used, such as a mixture of two or more materials, where the particular materials used in the mixture and their relative amounts will be selected in order to take advantage of the best traits of each.

Perovskite ceramic generally have the chemical composition $ABO_3$. There may be a mixture of two or more elements in the A-site and/or the B-site. Preferably, perovskites have the general formula $A_xA'_{1-x}B_yB'_{1-y}O_{3-\delta}$ wherein A is a group II metal (for example Ca, Sr, Ba or a mixture thereof); A' is a rare earth metal, a lanthanide or actinide (such as La, Sc, Y, Ce, Pr, Nd, Pm, Sm, Eu, Gd, Td, Dy, Ho, Er, Tm or U or a mixture thereof); B and B' are Mn, Cr, V, Ti Zr, Y Co and Fe or a mixture thereof; x is from 0 to 1.0; y is from 0 to 1.0; and $\delta$ is determined by the valence of the other metals. Some specific examples of perovskite ceramic materials include $La_{0.6}Sr_{0.4}Co_{0.2}Fe_{0.8}O_3$ (LCSF-6428), $La_{1-x}Ca_xFeO_3$ (x=0-0.5), $BaZr_{0.8}Y_{0.2}O_{3-\delta}$ (BZY), $BaCeO_3$, $BaZrO_3$, $Ba_{0.5}Sr_{0.5}Co_{0.2}Fe_{0.8}O_{3-\delta}$, $Ba_{0.5}Sr_{0.5}Co_{0.8}Fe_{0.2}O_{3-\delta}$, $Ba_{0.95}La_{0.05}FeO_{3-\delta}$, $SrCo_{0.2}Fe_{0.8}O_{3-\delta}$, $SrCo_{0.8}Fe_{0.2}O_3$ (SCF) and $SrSc_{0.05}Co_{0.05}O_{3-\delta}$. Perovskite ceramics may include double-layered perovskite such as $PrBaCo_2O_{5+\delta}$ and $Y_{1-x}Ca_xBaCo_4O_{7+\delta}$, x is from 0 to 1.0 and $\delta$ is determined by the valence of the other metals.

Fluorite ceramic materials generally have the structure $AO_2$. Some specific examples of fluorite ceramic materials include $Y_2O_3$ or $Sc_2O_3$-stabilized $ZrO_2$ and $Sm_2O_3$ or $Gd_2O_3$-stabilized $CeO_2$. Gadolinium doped ceria (GDC) is a fluorite ceramic electrolyte used in solid oxide fuel cells (SOFCs). GDC typically provides higher ionic conductivity and can be used at lower operating temperatures (<700° C.). GDC has the formula $Ce_{0.8}Gd_{0.2}O_{2-\delta}$. In some embodiments, the GDC is $NiO/Gd_2O_3$-stabilized $CeO_2$ (GDC).

Bismuth oxide based materials, which are within the class of ceramic materials that may be used, are stable even in highly reducing atmospheres. Examples of suitable bismuth oxide based materials include $Na_{0.5}Bi_{0.5}TiO_3$, $Bi_2V_{0.9}Cu_{0.1}O_{5.35}$, and $Sr_{1.65}Na_{1.35}Si_3O_{8.325}$.

Beta alumina ceramic materials generally have the nominal formula is $MAl_{11}O_{17}$ ("β alumina"), or $MAl_5O_8$ ("β" alumina") in which M represents a cation, which is typically monovalent. These ceramics have a mobile cation, which is typically $Na^+$ or $K^+$ but can also be $Li^+$, $Ag^+$, $Pb^{2+}$, $Ba^{2+}$ or $Gd^{3+}$. Some specific examples of beta alumina ceramic materials include non-stoichiometric sodium aluminates ($Na_2O.Al_2O_3$), with approximate formulae $Na_2O.11Al_2O_3$ (β), and $Na_2O.5.33Al_2O_3$ (β"). In addition, alumina ($Al_2O_3$, in various forms) can be used as supports for catalysts in microchannel reactors.

In some embodiments, the ceramic material is a mixture of ceramic materials. The particular materials used in the mixture and their relative amounts can be selected to take advantage of the best traits of each. As a consequence, the articles or membranes of some embodiments are in the form of dual phase articles or dual phase membranes, and such articles or membranes are, in that case, prepared using a mixture of ceramic materials.

In one example, a dual phase membrane having improved oxygen flux can be prepared. During oxygen permeation across a ceramic membrane, $O^{2-}$ flows in one direction through the membrane, and electrons flow in the opposite direction to maintain charge balance. By selecting a ceramic material having a high oxygen permeability and a low electron conductivity and a ceramic material having a lower oxygen permeability and a higher electron conductivity, the mixed ceramic material can lead to a better balance of oxygen and electron fluxes, and hence an overall increase in oxygen flux. Expressed another way, the ceramic material may comprise a first ceramic component with an oxygen permeability and an electron conductivity, and a second ceramic material with a lower oxygen permeability and higher electron conductivity than the first ceramic material. It will be understood that the first and second ceramic materials are of a different identity. In one example, the first ceramic material may be a fluorite, and the second ceramic material may be a perovskite. Thus, the mixed ceramic material may comprise a fluorite ceramic material and a perovskite ceramic material. Preferably, the fluorite ceramic material is GDC and the perovskite ceramic material is LSCF.

Further improvement of the membrane properties may be achieved by the addition of a catalyst to the membrane surface. Accordingly, the present application provides articles or membranes comprising a catalyst supported on the membrane surface. The catalyst may be supported on the channel surfaces. For improved oxygen flux, the catalyst functions to accelerate the dissociation of molecular oxygen into ions or oxygen ion combination. In this example, the catalyst may be a Pt catalyst, a Pd catalyst or an Ag catalyst.

The relative amounts of ceramic materials used in a mixture may be in the range of from above 0 to 90 vol % of the first ceramic material and from less than 100 vol % to 10 vol % of the second ceramic material(s). In the embodiment where the mixed ceramic material comprises a fluorite ceramic material and a perovskite ceramic material, the mixture may contain from above 0 to 80 vol % fluorite and from less than 100 vol % to 20 vol % perovskite. Preferably, the mixture contains from 60 vol % to 80 vol % fluorite and from 40 vol % to 20 vol % perovskite. When the fluorite ceramic material is GDC and the perovskite ceramic material is LSCF, the mixture may contain from 65 vol % to 80 vol % GDC and from 35 vol % to 20 vol % LSCF. Preferably, the mixture contains 67 vol % GDC and 33 vol % LSCF.

In the method of the present invention, the phase inversion process can be conducted in the presence of additional components that assist in the formation of the article. One example of such an additional component is a dispersant which functions to prevent the components of the solution or slurry which contains the first solvent, a polymer and optionally a particulate material from clumping. Clumping would result in a non-homogeneous solution and a non-uniform article, which is undesirable. Examples of suitable dispersants include polyvinylpyrrolidone (PVP), polyethylene glycol, prionic acid or surfactants such as Span-80.

Methods of Manufacturing the Article

The articles or membranes of the present application may be produced by a range of techniques. There are two key techniques—the first involving templated phase inversion, and the second involving 3D printing.

Methods of manufacturing the article enable the formation of channels, typically microchannels, extending from a surface of the article into a body of the article. Preferably, the channels have high dimensional tolerances and uniformity, which provides a number of advantageous properties, such as, for example, improved performance and/or improved resistance to thermal shock.

According to the first technique, there is provided a method of manufacturing an article containing spaced channels including the steps of:
  bringing a template having spaced openings into contact with a solution comprising a first solvent and a polymer which is soluble in the first solvent;
  introducing a second solvent into the solution through the openings of the template to cause phase inversion of the solution and form an article containing spaced channels extending from a surface of the article into a body of the article.

According to the second technique, there is provided a method of manufacturing an article containing spaced channels including the steps of:
  providing an ink comprising a polymer, optionally a solvent, and optionally a particulate material to a 3D printer; and
  printing successive layers of the ink to form an article containing spaced channels extending from a surface of the article into a body of the article.

We describe the first technique in further detail as follows. However, features of the article produced by this technique also apply to the articles that can be produced by the second technique. This includes the physical features of the channels (length, width, spacing), porosity, density and so forth. In addition, the components of the composition used in the 3D printing technique can be selected from the range of materials of the same class described for the first technique (solvent, polymer and particulate material). Accordingly, in this regard, the following description applies equally to articles/membranes produced by both techniques.

Phase inversion is a versatile technique which permits a wide range of morphologies from channeled/porous to dense structures to be obtained.

Generally, the phase inversion process transforms a polymer from a liquid to a solid state in a controlled manner. For phase inversion to occur a solution comprising a first solvent and a polymer which is dissolved in the second solvent is provided, and a second solvent (which may be referred to as an antisolvent) is added to the solution. The first and second solvents are of a different identity. The first solvent is miscible with the second solvent, but the polymer is insoluble in the second solvent. As the first and second solvents interdisperse, the polymer will transform from a liquid phase into a solid phase.

Additional components may be added to the solution to produce an article comprising that additional component. In some embodiments, a particulate material may be included in the phase inversion process to prepare an article comprising that particulate material. In some embodiments, the particulate material is insoluble in the solution, and the combination of the first solvent, the polymer and the particulate material forms a slurry. The nature of the particulate material used to form the article will, in part, determine the properties of the article. For example, if a ceramic material is used in the process, the resulting ceramic article may, for example, be used in gas separation applications.

In the method of making an article containing spaced channels, phase inversion occurs when a solution or slurry comprising a first solvent, a polymer which is dissolved in the second solvent and optionally a particulate material suspended in the first solvent is combined with a second solvent (the antisolvent). When present, the particulate material is typically suspended in the solution containing the first solvent and the polymer rather than being suspended in the second solvent. Again, as the first and second solvents interdisperse, the polymer and optionally the particulate material will solidify to form the article containing spaced channels.

The first solvent may be any solvent which enables phase inversion to occur with the second solvent. The first solvent is miscible with the second solvent, and may be referred to as an antisolvent miscible solvent. The first solvent is also a solvent that is suitable for dissolving the polymer. Suitable examples of the first solvent include 1-Methyl-2-pyrrolidinone (NMP), acetone, dimethylsulfoxide (DMSO), dimethyl formamide (DMF) and tetrahydrofuran (THF), dimethylacetamine (DMAc), formyl piperidene (FP), dioxane, acetic acid (HAc), morpholine (MP).

The second solvent, or antisolvent, may be any solvent that is miscible with the first solvent but cannot dissolve the polymer, to allow phase inversion to occur. Examples of suitable antisolvents include water, ethanol, glycol, isopropanol or mixtures thereof. Preferably, the antisolvent is water or comprises water.

The ratio of the amount of the first solvent to the amount of the second solvent that is used in the method may contribute to the final structure of the ceramic article. The ratio of first solvent:second solvent used in the method is about 5:1 or greater. In some embodiments, the ratio of first solvent:second solvent used in the method is in the range of 10:1 to 100:1. The ratio of the first solvent:second solvent used in the method affects the length of channels that are formed in the article.

Hereafter, the term "solvent" may be used interchangeably with the term "first solvent", and the term "second solvent" may be used interchangeably with the term "antisolvent".

The polymer may be referred to as a polymeric binder and these terms may be used interchangeably. There is a wide choice of polymers that can be used as the polymer or polymeric binder, provided that they are soluble in the first solvent (the antisolvent miscible solvent) and insoluble in the second solvent (the antisolvent). Some examples of suitable polymers include polyethersulfone (PESF), ethylene-vinyl alcohol (EVAL), cellulose acetate (CA), polysulfone (Psf), polyacrylonitrile (PAN), cellulosics, polyvinylidone fluoride (PVDF), polyimides (PI), polyamides (PA), acrylonitrile butadiene styrene (ABS), polycarbonate (PC), polylactic acid (PLA), high density polyethylene (HDPE), PC/ABS, and polyphenylsulfone (PPSU) or mixtures thereof. The amount of the polymer that is used is the method may contribute to the final structure of the ceramic article. The weight ratios of polymer to solvent are in the range from 10% to 50%. The weight ratio within the range of 15-25% may produce the longest straight channels.

In some embodiments, the polymer may be removed after the article is formed. For example, where the article is subjected to heat treatment following phase inversion, the polymer may be at least partially or completely removed. Preferably, minimal damage for example, contamination, shrinkage, and cracking due to escaping decomposition gases is caused to the article by removal of the polymer.

In the present method, the antisolvent is introduced into a solution or slurry comprising the first solvent, a polymer and optionally a particulate material to cause phase inversion of the solution or slurry and form an article comprising channels. As the antisolvent moves progressively through the solution or slurry, the article is progressively solidified. The phase inversion process may be allowed to progress over a period of time that will depend on the thickness of the article being manufactured and the slurry composition. Thus, the process may comprise conducting phase inversion over a period of time from about 10 minutes to about 24 hours. For example, if the thickness of the ceramic article being manufactured is 800 µm, the phase inversion may be allowed to continue for a period of 20 minutes; if the thickness of the ceramic article being manufactured is 2,500 µm, the phase inversion may be allowed to continue for a period of 3 hours.

In embodiments in which the solution comprises a particulate material, an antisolvent-insoluble polymer and an antisolvent miscible solvent, the components of the solution may be referred to as a slurry or a particulate slurry, and are combined before phase inversion is conducted. The components are preferably mixed to form a homogeneous particulate slurry. The mixture may be milled (for example, ball milled) to assist in obtaining homogeneity. It is important that the slurry is homogeneous so that the article produced is uniform in density and configuration.

The particulate material used in the particulate slurry is as defined above.

In an embodiment of the present method, a template having spaced openings is brought into contact with a particulate slurry, and the an antisolvent is introduced into the particulate slurry through the openings of the template to cause phase inversion of the particulate slurry and form an article containing spaced channels extending from a surface of the article into a body of the article.

The term "channel" is used broadly, and encompasses shallow passages, voids or bores. The channels may have a cross-sectional area of any suitable shape or dimension. Accordingly, the term "channel" is not intended to infer any dimensionality unless otherwise specified. In one embodiment, the channels are substantially uniform in size or diameter and/or spacing between the channels across the surface of the article. In another embodiment, each channel is substantially uniform along its length, where the length corresponds to the direction of passage of the antisolvent into the solution or particulate slurry during phase inversion. In this context, each of the channels is substantially uniform in terms of their diameter or cross-section along the length of the channel.

The term "microchannel" has the same meaning as the term "channel" as defined above. However, the diameter is in the order of microns. Preferably, the diameter of the microchannels is in the range of about 0.5 µm to about 300 µm.

The resulting channel-containing structure of the article results in improved performance, such as improved flux across the article. Without wishing to be bound by theory, these improvements are thought to arise from the substantially shortened permeation distance and the enlarged membrane surface area within the channels. Where the article is other than a membrane and is intended for use, such as in a microreactor, uniform channels structure is also advantageous.

The growth of channels is directed by diffusion of the solvent and antisolvent. A driving force that determines the direction of channel growth is the spatial availability of solvent (i.e. the driving force of mixing antisolvent and solvent). The spaced channels extending from a surface of the article into a body of the article may be substantially straight/linear channels, which may be substantially perpendicular to the structure or inclined at another angle to the surface, or the channels may be curved. Since the channels are elongated in the direction of movement of the antisolvent, the phase inversion process may be performed in conditions that produce straight/linear channels (perpendicular or inclined), or curved channels. In one example, channels that are not perpendicular to the article surface could be produced by appropriate configuration and orientation of the solution or slurry with respect to the diffusion of the antisolvent into the solution or slurry. This may be achieved by using a mould of appropriate configuration. A straight channel is one that extends in one direction without any significant curvature. In some embodiments, the walls of the channels are parallel or substantially parallel to each other. The inclination of the channel refers to the angle ($\theta$) between the channel and the surface of the article. In some embodiments, the channel to article surface angle ($\theta$) is within the range of 45-135°. Preferably, the channel to article surface angle ($\theta$) is about 90°. Expressed another way, the channel is substantially perpendicular to the article surface.

The channels may terminate within the body to form closed channels or may extend through the body such that the channels are open at opposite ends. The channels may be short or shallow channels relative to a width of the body, or may extend across a substantial portion of the body. In some embodiments, the closed channels are substantially straight and terminate within the body of the article to leave a dense layer on the opposite surface of the article. The dense layer is suitably a thin dense layer, which may have a thickness between 10 µm and 5000 µm or preferably 10-50 µm. In some embodiments, the thin dense layer may have a thickness within the range of between 10 µm and 5000 µm, 10 µm and 3000 µm, 10 µm and 2000 µm, 10 µm and 1000 µm, 10 µm and 500 µm or 10 µm and 200 µm. In another embodiment, the thin dense layer may have a thickness within the range of between about 10 to about 150 µm.

In the present method, the antisolvent is preferably directed into the particulate slurry using a template having spaced openings through which the antisolvent passes. A template refers to any 2-dimensional article or assembly of articles having openings in which the opening location, size and arrangement is selected to control the desired location of the channels. As an example, the term "template" may refer to a grid template, such as a pattern or gauge, which may be used in the present method as guide through which the antisolvent is directed. As another example, the "template" may refer to a self-assembling template (or fugitive template).

A grid template may comprise woven wires, or may be sheet-like having openings in it. Grid templates will typically be mechanically removed after phase inversion, and may, in principle, be re-used.

A self-assembling template or "fugitive" template may be comprised of closely packed objects, such as spheres, of the appropriate size, material, and density. Suitable materials can include polymers, carbon, or metal. When phase inversion is conducted using a fugitive template, the antisolvent is directed through the gaps between the self-assembled objects. After phase inversion, the objects may be removed in such a way as to avoid damage to the newly formed article, for example, the fugitive template may be chemically removed, for example, by burning in air or by dissolving in acid. The fugitive template is typically not reusable.

The template may be used in the present method to provide spatial control over the interaction of the antisolvent with the solution or slurry containing the first solvent, the polymer and optionally the particulate material in order to produce a defined arrangement of channels during the phase inversion process. The manner in which the template directs formation of channels also includes directing the cross-sectional area, the aspect ratio, the orientation, the diameter and/or the depth of the channel.

The template can direct the location and formation of channels, and each opening in the template may produce one channel. The size of the channel (e.g. the cross-sectional area and/or the diameter of the channel) may also be controlled by the size of the openings that are present in the template. Accordingly, it has been found by the inventors that increasing the size of the opening in the template can increase the size of each channel.

In some embodiments, the channel diameter may be between 0.5 µm and 300 µm, 1 µm and 200 µm, 5 µm and 200 µm, 10 µm and 100 µm or 30 µm and 65 µm.

In some embodiments, the channel length may be greater than 0, and up to 5000 µm, up to 4800 µm, up to 3000 µm, up to 2000 µm, up to 1000 µm, up to 800 µm or up to 500 µm.

Where the template is provided with openings that are uniform in size and spacing, the template will direct formation of channels that are uniform in size and spacing across the surface of the article. While not wishing to be bound by theory, it is suggested that the uniform channels have an equivalent and balanced ability to extract the solvent from the solution or slurry, which promotes uniform and long channel formation.

In bringing the template into contact with the solution or slurry containing the first solvent, the polymer and optionally the particulate material, the template is preferably located below the surface of the solution or slurry. The antisolvent may then be applied to the surface of the solution or slurry, so that phase inversion occurs progressively as the antisolvent moves through the template and into the solution or slurry, while directing the formation of channels which are elongated in the direction of movement of the antisolvent. The method may further comprise removing the template after phase inversion. By locating the template below a surface of the solution or slurry, the template also provides a mechanism for removing the surface of the solution or slurry (also referred to as the skin layer after phase inversion) to expose the openings of the channels. This may be done after phase inversion, by simply lifting off the template (and the thin skin layer) from the solidified solution or slurry, leaving the opened pore channels. Alternatively, the template may be removed by any other suitable technique.

The template comprises spaced openings through which the antisolvent passes, and is capable of sustaining defined channel shapes over the phase inversion process. The material used must be compatible with the solution or slurry and the antisolvent used. For example, the material may be metal or may be a plastic, ceramic or carbon. The template may, for example, be a mesh or gauze having a range of wire diameters and aperture sizes (such as a mesh or gauze made from wires with different cross-sections, such as square or circular may be used), or may be a flat metal plate in which the spaced openings are machined, etched or electroformed. In some embodiments, the template is a metal mesh, such as a stainless steel mesh.

It has also been surprisingly found that the article porosity may either vary or may slightly decrease as the openings in the template increase in size (e.g. the cross-sectional area and/or the diameter of the opening increases) and/or the channel size increases. In some instances, the article porosity is decreased as the openings in the template and/or the channel size increases, in which case, the degree of channel formation in the ceramic article is reduced as the openings in the template increase in size.

The openings provided in the template may have a diameter of between 1 µm and 500 µm, 1 µm and 300 µm, 1 µm and 200 µm, 5 µm and 200 µm, 10 µm and 100 µm or 35 µm and 150 µm.

The spacing between the openings provided in the template may be between 1-500 µm Since the template will direct the formation of channels across the surface of the article, the spacing between the openings provided in the template will direct the thickness of the walls between the spaced channels. The walls between the spaced channels may have a thickness of between 1-500 µm.

In some embodiments of the method, the template is brought into contact with the solution or slurry containing the first solvent, the polymer and optionally the particulate material in a mould. The mould may have any shape or configuration that is suitable for formation of the article. For example, the mould may have a base, side walls and an open top so as to be suitable for formation of an article having a substantially planar body. The mould could also be cylindrical or elliptical in configuration. It will be appreciated that the configuration and dimensions of the mould can be altered to allow formation of a range of dimensions and shapes of structures having various lengths, depths, widths, annular or elliptical cross-sectional shapes, wall/membrane thicknesses, tube diameters, and degree of uniformity.

Phase inversion results in formation of an article. Subsequent heat treatment may be employed to convert the article into a robust structure. In one embodiment, the method further comprises the step of drying, curing, heating or sintering. The heat treatment step may be applied equally to green membranes formed by 3D printing, and therefore the discussion of this step below applies equally to articles/membranes formed by the first and second manufacturing methods.

The sintering temperature that is used in the method will depend on the nature of the material used to form the article. Sintering must be conducted above the critical temperature for the material, otherwise sintering will not occur. During sintering, the material used to form the article will densify and a more robust article will be formed. The sintering temperature may contribute to the final structure of the article. Different materials and particle sizes need different densifying temperatures, normally within the range of 900 to 1500° C. As one example, a ceramic article may be sintered at a temperature of about 1350° C. At lower sintering temperatures, sintering of ceramic articles may not be complete, and the article may not be gas-sealed.

Sintering may be allowed to progress over a period of time that will depend on the thickness and size of the article being manufactured. Preferably, sintering will be conducted over a period of 1-10 hours. The time period that is selected will depend on the temperature used. For example, it may be desirable to conduct sintering at a lower temperature and over a longer time period, or at a higher temperature for a shorter time period.

During sintering of the article it will also be appreciated that a shrinkage of the thickness of the article material may occur, typically about 10-30% of original pre-compacting thickness, which must be factored into the size of the mould/cavity when attempting to obtain a particular article or, for example, a particular membrane thickness.

For the formation of a ceramic article, the method will typically further comprise the step of sintering the ceramic membrane to form a sintered ceramic membrane structure. The sintering conditions can be optimised to reduce the risk that defects may occur in the ceramic membranes.

In some embodiments, the polymer that is used in the phase inversion process may be removed after the article is formed. For example, where the article is subjected to heat treatment following phase inversion, the polymer may be at least partially or completely removed. Typically, the polymer is substantially or completely removed. Preferably, minimal damage for example, contamination, shrinkage, and cracking due to escaping decomposition gases is caused to the article by removal of the polymer.

In one embodiment, the channels formed in an article extend through the body such that the channels are open at opposite ends. This may be achieved in a number of different ways. The following is an example (shown by reference to FIG. 1) of the method which could be used to produce an article in which the channels are open at both ends.

Preparation of such a channeled article requires the use of a first solution comprising a first solvent and a polymer which is soluble in the first solvent which is used to make the article (shown in FIG. 1a as "Slurry 1") and a second solution, shown in FIG. 1a as "Slurry 2", which in this example, contains fugitive spheres or particles and is cast at the bottom of a mould. Typically "Slurry 2" will be applied as a thin layer (for example in a thickness in the range of 100-300 μm). "Slurry 1" is cast above the layer of "Slurry 2" (for example, "Slurry 1" may be applied to form a layer of 600-5000 μm in thickness), and a template is applied below the surface of "Slurry 1". After phase inversion, the template and a skin layer formed on the template may be removed, and following demoulding and a heat treatment step, an article in which the channels are open at both ends is formed.

Figure 1B:
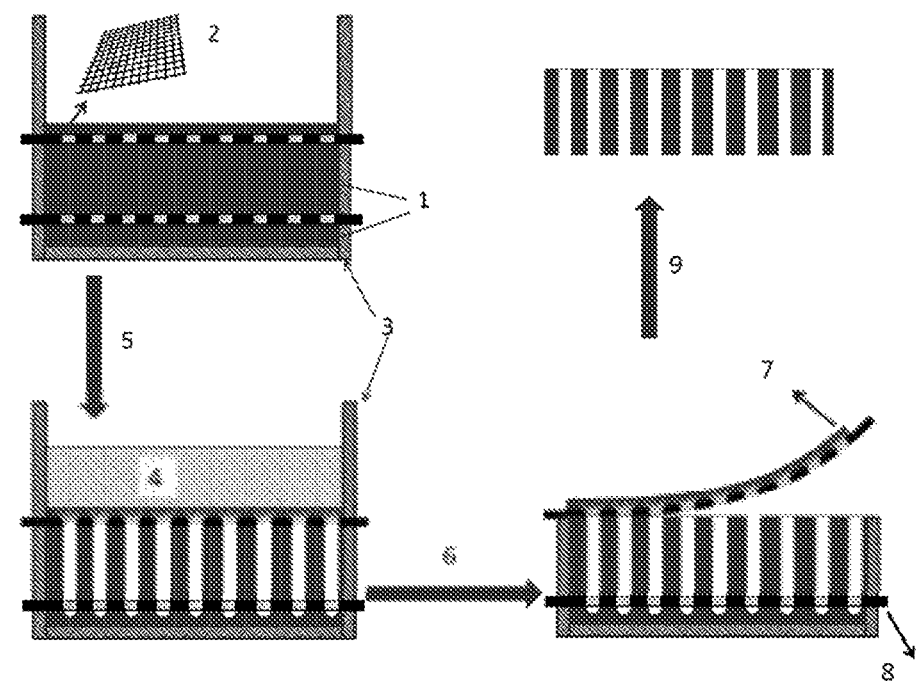

Preparation of such a channeled article may also use a template at the bottom of the mould, as shown in FIG. 1b. After phase inversion, the templates and the respective skin layer and bottom layer formed beyond each template may be removed. For example, the top template and top skin layer are lifted off the mould and the bottom of the mould is removed to allow the bottom template and the bottom layer to be removed from the mould. Following demoulding and a heat treatment step, an article in which the channels are open at both ends is formed.

In the following we describe in further detail some aspects of the second alternative method for the manufacture of the articles or membranes, involving 3D printing.

3D printing or "additive manufacturing" is a process of making a three-dimensional solid object of virtually any shape from a digital model. 3D printing is achieved using an additive process, where successive layers of material are laid down in different shapes. The layers are made by extruding a polymer or polymer precursor (that is in solution, in a suspension, or in molten form) through fine nozzles in a controlled way. Recent advances in 3D printer performance and specifications, particularly with reference to lateral and vertical resolution, as well as the range of materials that can be used as "inks", permit manufacture the channeled article of the invention.

In one embodiment, there is provided a method of manufacturing an article containing spaced channels including the steps of:

providing an ink comprising a polymer and optionally one or both of a solvent and a particulate material to a 3D printer; and printing successive layers of the ink to form an article containing spaced channels extending from a surface of the article into a body of the article.

The ink comprises a polymer, optionally a solvent, and optionally a particulate material.

The polymer or polymeric binder used in the ink is as defined above. However, some particular examples of polymers which may be used in the ink may include acrylonitrile butadiene styrene (ABS), polycarbonate (PC), polylactic acid (PLA), high density polyethylene(HDPE), PC/ABS, and polyphenylsulfone (PPSU).

The ink may optionally comprise a solvent. When a solvent is used in the ink, the solvent will be selected for its ability to dissolve the polymer, however, other properties such as volatility and viscosity will also be important. Some examples of solvents which may be used in the ink include 1-Methyl-2-pyrrolidinone (NMP), acetone, dimethylsulfoxide (DMSO), dimethyl formamide (DMF) and tetrahydrofuran (THF), dimethylacetamine (DMAc), formyl piperidene (FP), dioxane, acetic acid (HAc), morpholine (MP).

The ink may optionally comprise a particulate material. In embodiments in which the ink comprises a particulate material, the components of the ink may be referred to as a slurry or a particulate slurry. The components are preferably mixed to form a homogeneous particulate slurry. The mixture may be milled (for example, ball milled) to assist in obtaining homogeneity. It is important that the slurry is homogeneous so that the article produced is uniform in density and configuration.

The particulate material used in the ink is as defined above.

The article produced by 3D printing contains spaced channels extending from the surface of the article into the body of the article. The channels (or microchannels) are as defined above, including the channel properties such as the channel diameter, the channel length, the article porosity, the spacing between the channels and the thickness of the walls between the spaced channels.

Subsequent heat treatment may be employed to convert the article into a robust structure. In one embodiment, the method further comprises the step of drying, curing, heating or sintering as described above.

An additional benefit provided by 3D printing is that, more than one ink may be used to prepare the article. Accordingly, inks can be alternated to produce, for example, stratified layers of different polymers and optionally particular materials, surface embedding of catalyst particles, and the like.

The method of preparing an article according to the present invention will now be described with reference to the use of template-assisted preparation of a membrane. It will be appreciated that the following description is an example of the method of the present invention, and it will be understood by a person skilled in the art of the invention that the following description does not limit the scope of the invention.

Template-Assisted Manufacture of the Ceramic Article or Membrane

In one embodiment, there is provided a method of manufacturing a ceramic article including the steps of:

bringing a template having spaced openings into contact with a ceramic slurry;

introducing an antisolvent into the ceramic slurry through the openings of the template to cause phase inversion of the ceramic slurry and form a ceramic article containing spaced channels extending from a surface of the ceramic article into a body of the ceramic article.

In another embodiment, the ceramic article may be a ceramic membrane.

Figure 2:
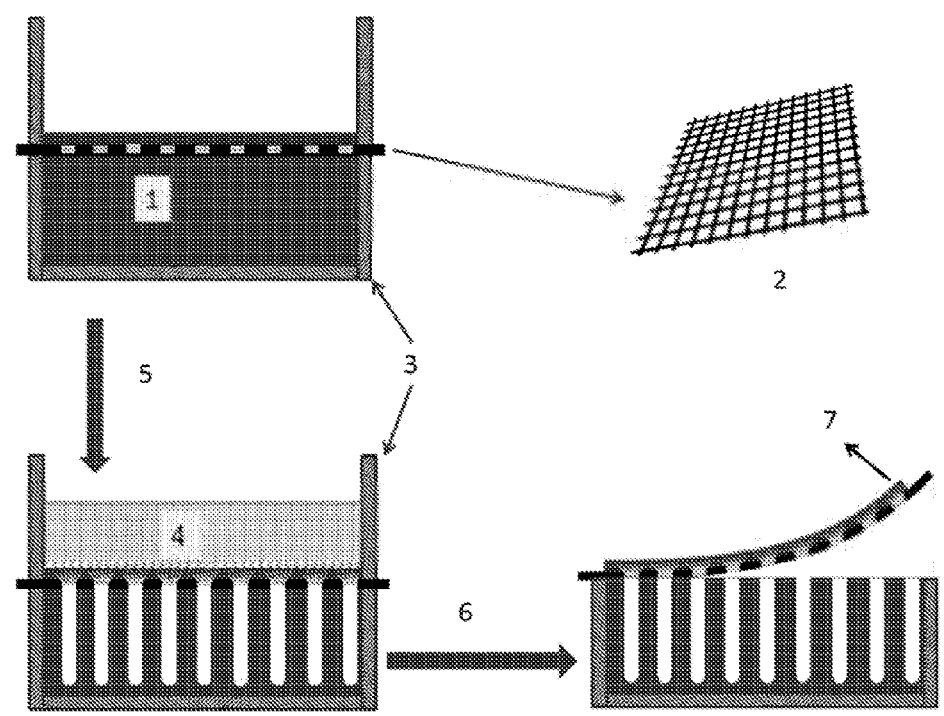
FIG. 2 is a schematic representation of the preparation of new membranes by a template phase-inversion process. The numerals shown in FIG. 2 represent the following: 1 is slurry; 2 is a stainless steel mesh; 3 is a mould; 4 is water; 5 is the step of phase inversion; 6 is the step of removing skin layer; 7 shows lifting off the mesh.

The template-assisted manufacture of a ceramic membrane is schematically represented in FIG. 2. In this embodiment of the method, a ceramic slurry is cast into a mould for the formation of a ceramic membrane. A template is used to direct the antisolvent into the slurry (which is shown in FIG. 2 as a stainless steel mesh), and is immersed below the surface of the ceramic slurry. The antisolvent (which is represented in FIG. 2 as water) is poured on top of the slurry to cause phase inversion of the ceramic slurry and form the ceramic membrane. Consequently, the phase inversion starts from the top of the slurry, and channels are formed as the antisolvent moves towards the base of the mould. In this example, the antisolvent is directed into the ceramic slurry through the spaced openings in the template to create spaced channels which extend from a surface of the membrane, and terminate within the body of the membrane to form closed channels.

After phase inversion, the surface of the ceramic membrane (referred to in FIG. 2 as a skin layer) that is located above the mesh can be removed by simply removing (e.g. lifting) the mesh from the solidified ceramic membrane (or "green membrane"). Removal of the surface of the ceramic membrane (the skin layer) exposes openings of the channels, which are shown in FIG. 2 as closed channels in which a thin layer of solidified ceramic slurry covers the opposite surface of the ceramic membrane. The resulting membrane structure is substantially simplified compared with the structure of hollow fibre membranes, and the channel structure present in the membrane results in improved properties, for example, improved oxygen permeation flux across the membrane, due to the substantially shortened oxygen conduction distance and enlarged membrane surface area within the channels.

Although not shown in FIG. 2, the method may also include the step of sintering the ceramic membrane to form a sintered ceramic membrane. Following the step of sintering, the thin layer covering the opposite surface of the ceramic membrane forms a dense layer, and the channels are retained in the ceramic membrane. In some cases, there is some shrinkage of the channels during sintering.

A channel-containing membrane has been prepared by the modified phase inversion process described above. With the aid of a mesh, the skin layer of the membrane was removed. Moreover, the channel development during phase inversion was regulated by the mesh apertures, resulting in a short oxygen ion transfer distance and an enlarged membrane surface area. The oxygen permeation of the channel-containing membrane showed a high oxygen permeation flux (OPF) of 3.1 ml cm$^{-2}$ min$^{-1}$ at 1100° C., which is more than five times of that of a conventional dense membrane of comparable thickness.

Channeled Articles and Channeled Membranes

The present invention relates to channeled articles, typically microchanneled articles, prepared by the method as described above, and also relates to channeled membranes having a particular final structure.

In one embodiment, there is provided an article comprising a ceramic body having spaced channels created at a surface of the ceramic body and extending into the ceramic body, wherein the channels are located at spaced locations.

The degree or extent of channel formation in the article is the "article porosity". In one embodiment, the article porosity may be between 0-50%.

Conventional ITMs are configured such that they comprise a dense layer attached to a porous support layer. However, in some embodiments, the membranes of the present invention have an integral construction in which the dense layer and the support layer are integral and are made of the same material. This configuration is advantageous when compared with conventional membranes, as for conventional membranes to obtain similar properties to the membranes of the present invention, such as oxygen permeation flux values, the support layer must have a significantly higher article porosity (for example, above 50% to about 60%) which makes the support part of the membrane in the conventional membrane intrinsically weaker, and the overall mechanical strength of the conventional membrane is reduced.

In some embodiments, the articles of the present invention have improved mechanical strength compared to conventional articles.

The articles of the present invention comprise spaced channels extending from a surface of the article into a body of the article. The term "channel" is as defined above and is intended to encompass shallow passages, voids or bores. The channels may have a cross-sectional area of any suitable shape or dimension. Accordingly, the term "channel" is not intended to infer any dimensionality unless otherwise specified. Preferably, the channels have a substantially circular cross-section.

The term "microchannel" has the same meaning as the term "channel" as defined above. However, the diameter is in the order of microns. Preferably, the diameter of the microchannels is in the range of about 0.5 μm to about 500 μm.

According to some embodiments, the channels (or microchannels) are substantially uniform in size or diameter and/or spacing between the channels across the surface of the article.

According to other embodiments, the channels are substantially uniform along their length, where the length corresponds to the direction of passage of the antisolvent into the solution or slurry during phase inversion. In this context, each of the channels is substantially uniform in terms of their diameter or cross-section along the length of the channel.

The spaced channels (or microchannels) extending from a surface of the article into a body of the article may be substantially straight/linear channels (perpendicular or inclined), or curved channels. In some embodiments, the walls of the channels are parallel or substantially parallel to each other. The inclination of the channel refers to the angle (θ) between the channel and the surface of the article. In some embodiments, the channel to article surface angle (θ) is within the range of 45-135°. Preferably, the channel to article surface angle (θ) is about 90°. Expressed another way, the channel is substantially perpendicular to the article surface.

The channels (or microchannels) may terminate within the body to form closed channels or may extend through the body such that the channels are open at opposite ends. The channels may be short or shallow channels relative to a width of the body, or may extend across a substantial portion of the body. Preferably, the closed channels are substantially straight and terminate within the body of the article to leave a dense layer on the opposite surface of the article. The dense layer is suitably a thin dense layer, which may have a thickness between 10 μm and 5000 μm, or preferably 10-150 μm. In some embodiments, the thin dense layer may have a thickness within the range of between 10 μm and 5000 μm, 10 μm and 3000 μm, 10 μm and 2000 μm, 10 μm and 1000 μm, 10 μm and 500 μm or 10 μm and 200 μm, or preferably about 10-150 μm.

In some embodiments, the channel diameter may be between 0.5 μm and 300 μm, 1 μm and 200 μm, 5 μm and 200 μm, 10 μm and 100 μm or 30 μm and 65 μm.

In some embodiments, the channel length may be greater than zero and up to 5000 μm, up to 3000 μm, up to 2000 μm, up to 1000 μm, up to 800 μm or up to 500 μm.

The spacing between the channels (or microchannels) determines the channel density. In some embodiments, the article will have a channel density of 0-50%. By "channel density" we refer to the cross-sectional area of the channels as a percentage of the total cross-sectional area. The channels are separated by walls, and the thickness of the walls defines the spacing between the channels. In some embodiments, the walls may have a thickness of between 10-500 μm.

The ratio of the area of the channels (or microchannels) formed in the article to the area of the article results from a combination of the channel diameter and the channel spacing. If the channels are regularly spaced across the article surface, the arrangement or pattern the channels are formed in (e.g. the channels may be arranged in a square pattern, a hexagonal pattern, etc.) may also contribute to the ratio of the area of the channels formed in the article to the area of the article. In some embodiments, the ratio of the area of the channels formed in the article to the area to the area of the article is between 0-50%.

The article has a number of advantageous properties, which will depend in part on the nature of the material used to form the article. For example, where a ceramic material is used to form a ceramic article, improved performance may be achieved such as ion transfer rate, gas diffusion rate and surface area for supporting catalysts and/or improved resistance to thermal shock. Properties such as the operating temperature range, the thermal expansion coefficient, the intrinsic $O^{2-}$ conductivity and the catalytic activity are typically determined by the choice of material used to make the articles.

In some embodiments, the article has an improved ability to withstand thermal shock. This improvement is due to the construction of the article as an integrated article, and the preparation of the article from one material in a single step. Where the article is an oxygen permeation membrane, Solid Oxide Fuels Cells (SOFCs) and Solid Oxide Electrolysis Cells (SOECs) undergo large, rapid changes in temperature on start up and shut down, and thermal shock resilience is an important property in achieving acceptable lifetime and robustness.

In some embodiments, the article has a higher density for a given gas diffusion capacity compared to conventional thin membranes on porous supports. This is because the channel structure of the ceramic article is more efficient for gas diffusion, which permits a lower porosity, (i.e. a higher density of the ceramic article) and higher mechanical strength (for a given dense layer thickness). In one embodiment, the article porosity may be between 0 and 50%. In another embodiment, the article porosity may be between 10 and 40%. In a further embodiment, the article porosity may be between 20 and 30%.

In embodiments where the article is a ceramic article, the article has an improved oxygen permeation flux (OPF). The ceramic articles of the present invention are able to facilitate gas diffusion via the spaced channels of the ceramic article which are created at a surface of the ceramic body and extending into the ceramic body, and serve to enlarge the active surface of the ceramic article. Oxygen transport across a ceramic article may occur via physical movement of molecular oxygen through open spaces, and via the channels or microchannels in the article (or through imperfections in the article such as cracks, etc.). However, oxygen transport may also occur via lattice "hopping" through a solid lattice, this type of transport will be included in OPF measurements, and is distinct from conductivity across the membrane via the channels. Preferably, the ceramic article has an oxygen permeation flux (OPF) within the range of 2-12 $ml.cm^{-2}.min^{-1}$ at 1050° C.

The overall size of the channeled article or channeled membrane will depend on the membrane performance and the application. However, the performance of the channeled article or channeled membrane of the invention may provide a suitable OPF to be useful in a device as a single article or membrane, rather than having to stack articles or membranes. As one example, oxygen is required at rates of 1-5 liters/min for certain medical applications, therefore, an oxygen flux of about 10 $ml.cm^{-2}.min^{-1}$ will require a membrane area of 100-500 $cm^2$. Accordingly, the higher the OPF, the smaller the area of the channeled article or channeled membrane. However, the size of the channeled article or channeled membrane requires a balance between area and durability. In some embodiments, the channeled membrane has an area in the range of 10-200 $cm^2$. In another embodiment, a channeled membrane has an area in the range of 10-100 $cm^2$. In some embodiments, the membrane provides an oxygen flux of at least 5 $ml.cm^{-2}$ $min^{-1}$, and preferably at least 6, at least 7, at least 8, at least 9 or at least 10 $ml.cm^{-2}$ $min^{-1}$.

Oxygen permeation across the channeled articles (preferably channeled membranes) is driven by maintaining a differential partial pressure of oxygen on the two sides of the membrane. In one example, this can be achieved using a "sweep gas" on the side of the membrane away from the air side. In another example, the air could be pressurised to achieve a similar effect. It is also possible to use a "sweep gas" on the side of the membrane away from the air side and simultaneously, pressurise the air to drive oxygen permeation and increase oxygen flux.

In one embodiment, oxygen flux is enhanced by applying an electrical potential across the channeled article (preferably across a channeled membrane). Oxygen is transported across the membrane as oxygen ions ($O^{2-}$), and according to Faraday's Law, the flux can be increased by applying a voltage that drives an ionic current. The application of an electrical potential across the channeled article (preferably across a channeled membrane) results in a significantly higher oxygen flux when compared to the oxygen flux achieved when the same voltage is applied to a comparable conventional membrane under similar conditions. Oxygen flux values of up to 17 ml.cm−2.min−1 at 1050° C. have been achieved by applying an electrical potential across the channeled membrane of the present invention. Oxygen flux may be further enhanced by applying an electrical potential across the channeled article in combination with the use of a "sweep gas" on the side of the membrane away from the air side and/or pressurising the air. It follows from this that in some embodiments, the membrane provides an oxygen flux of at least 10 $ml.cm^{-2}$ $min^{-1}$, and preferably at least 12, at least 14, at least 15, at least 16 or at least 17 $ml.cm^{-2}$ $min^{-1}$.

A suitable voltage for application of an electrical potential across the channeled article (preferably across a channeled membrane) is within the range of 1 to 50 V. In another embodiment, the voltage is within the range of 1 to 20 V. In a further embodiment, the voltage is within the range of 1 to 10 V.

Until now, an electrical potential has not been successfully applied across a microchanneled membrane, particularly due to difficulty in getting the potential applied evenly within the microchannels. Furthermore, it has been found that a single microchanneled membrane of the present invention can be suitably used in a device, as opposed to the need to use "a plurality of plates", where problems arise due to the application of voltages to each plate without electrical shorting.

Applying an electrical potential across the channeled article (preferably across a channeled membrane) at a high enough voltage can heat the article by several hundred degrees Celsius. One advantage of the increased temperature is that when the article is used a lower furnace temperature can be employed, thereby reducing operating costs.

Applications and Uses

The articles of the present invention may be suitable for application in filtration for gas-solid and liquid-solid separation, in batteries, in thermal to electric converters (such as alkali metal thermal to electric converters), in fuel cells (such as solid oxide fuel cells or molten-carbonate fuel cells), in electrolysis cells (such as solid oxide electrolysis cells) in micro reactors or in gas-catalytic processes. The articles may also be used in a variety of gas separation applications, such as in the production of oxygen and hydrogen gases from gas streams, to separate oxygen from air before it is mixed with fuel in low or zero emission power plants, allowing easier capture of carbon dioxide from a relatively pure exhaust stream, in applications such as natural gas conversion and hydrogen/synthesis gas production from fossil fuels and renewable energy, in the catalytic partial oxidation of methane to syngas, in the partial reduction of carbon dioxide to carbon monoxide or to create oxygen in many other applications unrelated to syngas.

In one embodiment, the articles of the present invention are suitable for use as supporting electrodes of solid oxide fuel cells (SOFCs). A SOFC is an electrochemical conversion device that produces electricity directly from oxidizing a fuel. In a SOFC, a solid oxide material is used as the electrolyte and conducts negative oxygen ions from the cathode to the anode. The channeled articles of the present invention are used as a porous anode support, and therefore, channels facilitate fuel gas diffusion through the anode to react with oxygen permeating through electrolyte, which is supported on the thin porous layer of the channeled anode. The article of the present invention can be prepared in a suitable configuration for use as a porous anode. The porous anode may be prepared using a mixed ceramic (such as NiO/$Gd_2O_3$-stabilized $CeO_2$ (GDC)) as the anode material. The oxide material used as the electrolyte may be $Sc_2O_3$-stabilized $ZrO_2$ (SSZ), the fuel may be hydrogen and the cathode may be made using a mixture of a perovskite ceramic and a fluorite ceramic, such as $Ba_{0.5}Sr_{0.5}Co_{0.2}Fe_{0.8}O_{3-\delta}$/GDC as the ceramic material.

In another embodiment, the articles of the present invention are suitable for use as supporting electrodes of solid oxide electrolysis cells (SOECs). A SOEC is a solid oxide fuel cell that runs in a reverse mode to achieve the electrolysis of water and/or $CO_2$. In a SOEC, the electrolysis of water and/or $CO_2$ occurs at the cathode and oxygen and hydrogen/CO gas are produced at anode and cathode, respectively. The channeled articles of the present invention are used as a porous cathode, and therefore, the steam and/or $CO_2$ diffuse through the porous cathode support and reach the interface between cathode and electrolyte to conduct the electrolysis. The article of the present invention can be prepared in a suitable configuration for use as a porous cathode. The porous cathode may be prepared using a mixed ceramic (such as NiO/$Gd_2O_3$-stabilized $CeO_2$ (GDC)) as the cathode material. The electrolyte may be $Sc_2O_3$-stabilized $ZrO_2$ (SSZ) and the anode may be made using a mixture of a perovskite ceramic and a fluorite ceramic, such as $La_{0.6}Sr_{0.4}Co_{0.2}Fe_{0.8}O_{3-\delta}$/GDC as the anode material.

In yet another embodiment, the articles of the present invention are suitable for use as a power-driven oxygen pump. Current electrochemical oxygen pumps use an electrolyte that has pure oxygen ion conductivity, such as doped zirconia. High operating temperatures are maintained by external heating with electrical furnaces. A different electrolyte that has some electronic conductivity as well as oxygen conductivity, such as doped ceria, is used so that the oxygen permeation membranes are heated by the current through the membrane. This can achieve heating with higher efficiency. By coupling a mixed conductivity electrolyte with the channeled articles of the present invention, less power is consumed for pumping the same amount of oxygen. Power-driven oxygen permeation typically produces a higher oxygen flux compared with permeation that is achieved without applying power, which causes the gas diffusion within porous supports to become a limiting step. The channeled articles of the present invention provide a lower resistance to oxygen conductivity compared with that of conventional thick membranes. In other words, using the channeled articles, preferably channeled membranes of the present invention eliminates gas diffusion resistance.

The operating temperature will depend on whether a voltage is applied to the channeled article of the present invention. Where no voltage is applied, the article may be heated by the furnace. Where a voltage is applied, the furnace temperature may be lowered as the voltage increases. In some embodiments, the voltage applied to the channeled membranes of the present invention is typically within the range of 1 to 50 V. In other embodiments, the voltage is within the range of 1 to 20 V. In a further embodiment, the voltage is within the range of 1 to 10 V. The operating temperature of the channeled article of the present invention is typically within the range of about 600 to 1000° C.

In the embodiment where the articles of the present invention are suitable for use as a power-driven oxygen pump, the ceramic material used to prepare the channeled membranes of the present invention are those having a high ionic conductivity and a low electronic conductivity or mixtures of materials (dual phase). The ceramic material combination may comprise a larger amount of ionic-conducting materials and a smaller amount of electronic-conducting materials (that is, more ionic-conducting material than the electronic-conducing material). In some embodiments, the ceramic material used to prepare the channeled membranes of such embodiments is a fluorite ceramic material, preferably a Gd-doped ceria ceramic material.

In a further embodiment, the articles of the present invention are suitable for use in natural gas conversion. Oxygen is produced in this process and removed from the system, typically by permeation through an ITM. Using the channeled articles, preferably channeled membranes of the present invention, the oxygen that permeates through a membrane can be reacted with natural gas in the presence of a catalyst Further to the advantages of improved oxygen permeation provided by the channeled membranes of the present invention, this reaction can increase the flow of oxygen through the membrane by reducing the partial pressure of oxygen on that side of the membrane. In this embodiment, the catalyst may be a cerium supported nickel fibrous catalyst bed. In this embodiment, the ceramic material used to prepare the channeled membranes of the present invention is preferably a perovskite ceramic material, such as $Ba_{0.5}Sr_{0.5}Co_{0.8}Fe_{0.2}O_3$.

The above applications make use of the increased flux (either by ion transport through a dense layer, or by diffusion through controlled pores), whilst retaining thermal shock stability, as a result of the article configuration.

In some of the applications, the use of catalysts will be required. One advantage of the articles of the present invention is that the spaced channels formed in the body of the article may be open at least at one end, which makes it possible to control catalyst impregnation. Typically, the catalyst will be provided in solution (for example, platinum chloride or palladium nitrate) and applied to the article surface. The catalyst may be applied either pre- or post-sintering of the article. Preferably, the catalyst is applied post-sintering to ensure that the sintering temperature does not affect the catalyst.

In one embodiment there is provided the use of the article as described above as a ceramic membrane for gas separation, as a support for membranes for gas-solid separation, as a support for membranes for liquid-solid separation, as a supporting membrane in a fuel cell, as a supporting membrane in an electrolysis cell, as a reaction plate for a microreactor, as a membrane in a battery, as a membrane in thermal to electric converters or as a membrane in a gas-catalytic process. In some embodiments, the article conducts oxygen ions, hydrogen ions or sodium ions.

In one embodiment there is provided a gas separation membrane comprising a ceramic membrane prepared by a method comprising the steps of:
  bringing a template having spaced openings into contact with a ceramic slurry; and
  introducing an antisolvent into the ceramic slurry through the openings of the template to cause phase inversion of the ceramic slurry and form a ceramic membrane containing spaced channels extending from a surface of the ceramic membrane into a body of the ceramic membrane.

In another embodiment there is provided a gas production method, comprising the steps of:
  providing a ceramic membrane comprising a ceramic body having spaced channels created at a surface of the ceramic body and extending into the ceramic body, wherein the channels are located at controlled spaced locations;
  introducing a first gas to one side of the membrane;
  withdrawing a second gas from an opposite side of the membrane.

Typically the first gas is a mixture of gas species, and the second gas is a single gas species that is present in the first gas mixture. The second gas may, for example, be hydrogen or oxygen. The second gas in some embodiments is oxygen. The first gas may be air. The gas production method may therefore be a method for the production of oxygen from air. As another example, the first gas may comprise molecules containing oxygen, such as water or carbon dioxide. In this example, the gas production method may involve removing oxygen from the first gas using a catalyst and/or applied voltage, and withdrawing oxygen from the opposite side of the membrane. It will be understood therefore that the expression "gas production method" is used in a broad sense, and alternative language that could be used in place of this is a "gas separation method".

The method may further comprises the step of applying an electrical potential across the ceramic membrane to increase the permeation flux of the second gas. In one specific example, the step of applying an electrical potential across the ceramic membrane increases the oxygen permeation flux.

EXAMPLES

The Examples below illustrate the performance of ceramic membrane compositions and structures of the present invention.

Example 1

Membrane Preparation

The ceramic membranes were prepared by phase inversion of a ceramic slurry, followed by sintering.

The ceramic slurry was prepared by dissolving 4.3 g of Polyethersulfone (PESF, Radel A-300) and 0.7 g of Polyvinylpyrrolidone (PVP, MW=40000) in 30 g of 1-Methyl-2-pyrrolidinone (NMP, 99%) in a beaker by magnetic stirring. PESF, PVP and NMP were purchased from Sigma-Aldrich, Australia. 65 g of $La_{0.6}Sr_{0.4}Co_{0.2}Fe_{0.8}O_{3-\delta}$ powder (LSCF-6428, Fuel Cell Materials, USA) with a surface area of 5.5 $cm^2/g$ was mixed with the above solution in a Teflon jar. The mixture was ball milled for 48 hours by a ball-miller (MTI Corporation, USA) at a speed of 300 RPM to form homogeneous slurry.

0.4 ml prepared slurry was added into an aluminium mould by a syringe, after degassing. A stainless steel mesh template was then immersed just below the surface of the slurry. Tap water was poured on top of slurry, and phase inversion was conducted over a 20 minute period.

After phase inversion, the stainless steel mesh was gently removed from the solidified membrane together with the surface of the solidified slurry (also referred to as the skin layer) to expose the openings of the channels that formed during phase inversion. After drying at 80° C. for 60 min, the membrane was heated in a box furnace (ModuTemp Pty. Ltd., Australia) at 600° C. to remove organic components and then sintered at 1350° C. for 5 hours.

Example 2

Preparation of a Ceramic Membrane with a Skin Layer (Comparative Example)

A membrane was prepared by the same process outlined in Example 1 above, without applying a mesh template. Accordingly, the resulting membrane included two opposite surfaces, with the channels formed during phase inversion being closed at both ends. This ceramic membrane is referred to as the ceramic membrane with a skin layer, or the ceramic membrane of Example 2.

Example 3

Characterization of the Ceramic Membranes of Examples 1 and 2

Figure 3:
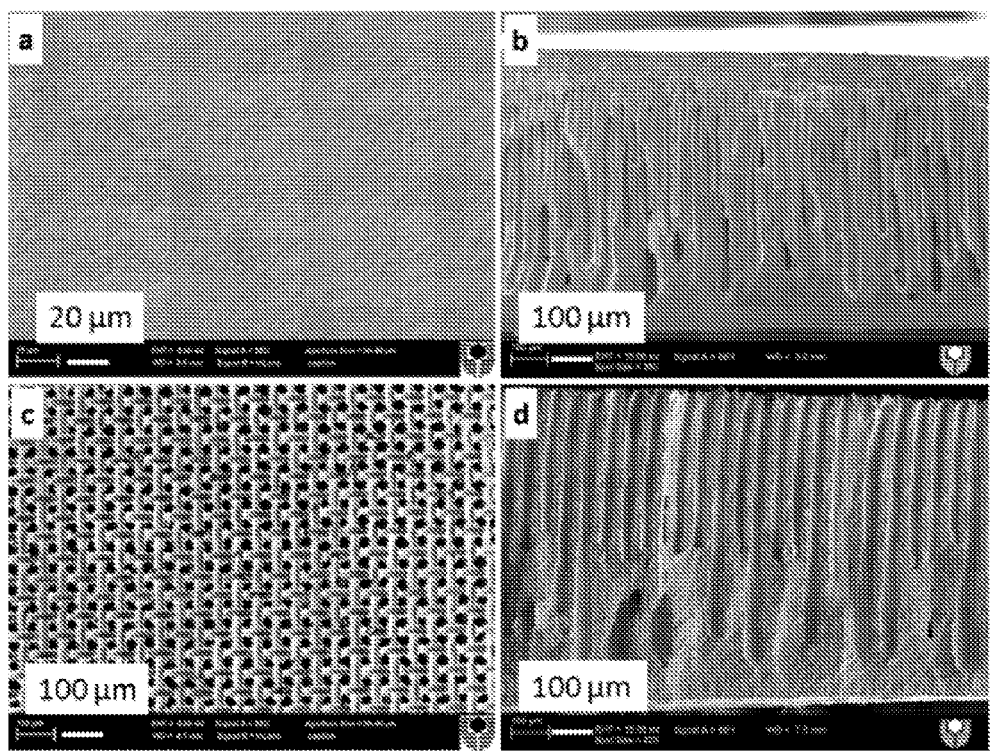
FIG. 3 shows Scanning Electron Micrograph (SEM) images of the surfaces and cross sections of the membranes without a skin layer (the ceramic membrane of Example 1 is shown in FIGS. 3c and 3d) and with a skin layer (the ceramic membrane of Example 2 is shown in FIGS. 3a and 3b) according to an embodiment of the present invention.

The microstructure of the prepared membranes was observed by Scanning Electron Microscopy (SEM). Porosity was tested by Archimedes' method and mercury porosimetry. FIGS. 3c and 3d shows the surfaces and cross sections of the membranes without a skin layer (the ceramic membrane of Example 1) and FIGS. 3a and 3b with a skin layer (the ceramic membrane of Example 2).

FIGS. 3c and 3d show the ceramic membrane of Example 1 in which the skin layer was completely removed by the mesh, and all channels were opened. The pore channels have uniform sizes of about 30 μm in diameter (and may be referred to as microchannels).

FIG. 3c shows that formation of the channels was templated by the mesh, as one mesh aperture produces one microchannel, as evidenced by the wire mesh trace shown on the membrane surface after the mesh is removed. These results indicate the possibility of controlling the pore size via mesh aperture size.

FIG. 3d is a cross-sectional SEM image of the membrane of Example 1, which shows that the microchannels extend straight across the membrane, with a thin dense layer (about 100 μm) at one surface of the membrane. This image also shows that the microchannels retain a similar diameter throughout their length.

FIGS. 3a and 1b show the ceramic membrane of Example 2, in which the skin layer is removed before sintering at 1350° C. to form a dense layer for oxygen separation.

FIG. 3b shows that the pore channels formed in the absence of a template are irregular. Numerous small pores start growing after the skin layer, and only some pores approach the bottom layer with greatly-increased pore sizes. This irregular structure occurs because these small pores compete in extracting the solvent, 1-Methyl-2-pyrrolidone (NMP) from the slurry into pores to develop themselves. Some pores stop growing, while other pores continue growing and become bigger by subsuming other pores.

This example shows that use of a template, such as a stainless steel mesh, plays a significant role in templating the formation of microchannels when the anti solvent passes through the mesh apertures during phase-inversion.

Figure 4:
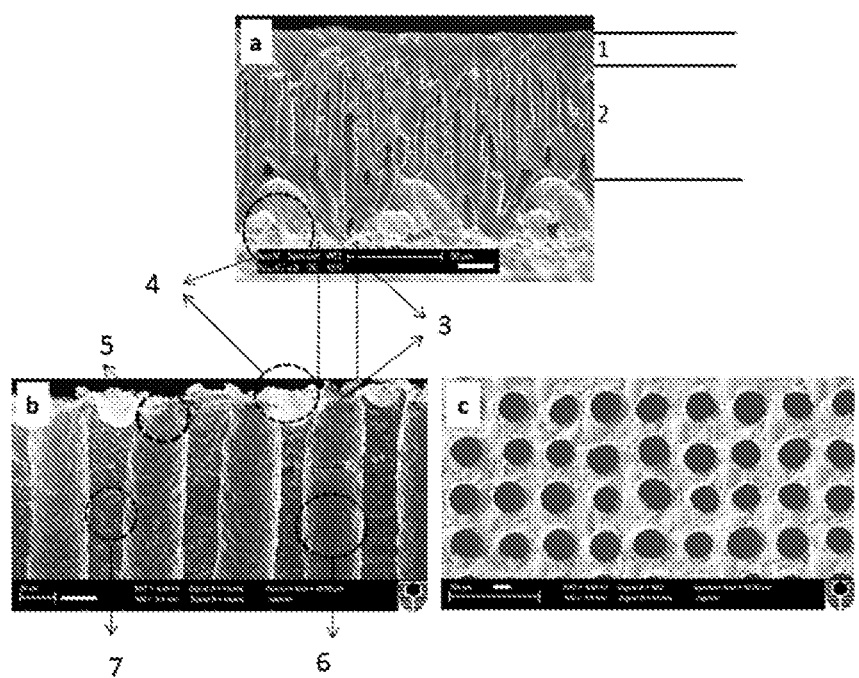
FIG. 4a shows a Scanning Electron Micrograph (SEM) image of the cross section of the skin layer of a membrane that formed above the mesh that was used as a template.
FIGS. 4b and 4c show a Scanning Electron Micrograph (SEM) image of the cross section and the polished surface (to remove the neck part) of a membrane formed by templating, after the skin layer has been removed (the ceramic membrane of Example 1 is shown in FIGS. 4b and 4c) according to an embodiment of the present invention. The numerals shown in FIG. 4 represent the following: 1 is the dense layer; 2 is the small pores before mesh; 3 is the mesh aperture position; 4 is the mesh wire trace; 5 is the microchannel neck; 6 is the microchannel; 7 is the microchannel wall.

FIG. 4a is an SEM image of a cross-section of the skin layer of a membrane that formed above the mesh that was used as a template. By comparison, FIG. 4b is an SEM image of a cross-section of a membrane that is formed beneath a template (such as the ceramic membrane of Example 1) to form uniform microchannels. The uniform microchannels have a unified and balanced ability to extract NMP from the slurry, which promotes uniform and long channel formation. Therefore, the stainless steel mesh template not only removes the skin layer but also regulates the microchannel development.

FIG. 4c shows an SEM image of the surface of the membrane prepared using a template (such as the ceramic membrane of Example 1) after polishing away the neck part. Before the skin layer is removed by lifting the mesh, a dense layer is present on top of the mesh (the skin layer), which is about 15 to 50 μm) in thickness having many small pores. The small pores start combining or disappearing when they approach the mesh, and finally become a single large pore channel within one mesh aperture.

Example 4

Thicker Microchanneled Membrane

A membrane was prepared by a similar process to that outlined in Example 1 above. The membrane was prepared using $La_{0.6}Sr_{0.4}Co_{0.2}Fe_{0.8}O_3$, and the resulting ceramic membrane was 1.7 mm thick. This ceramic membrane is referred to as the ceramic membrane of Example 4.

Figure 5:
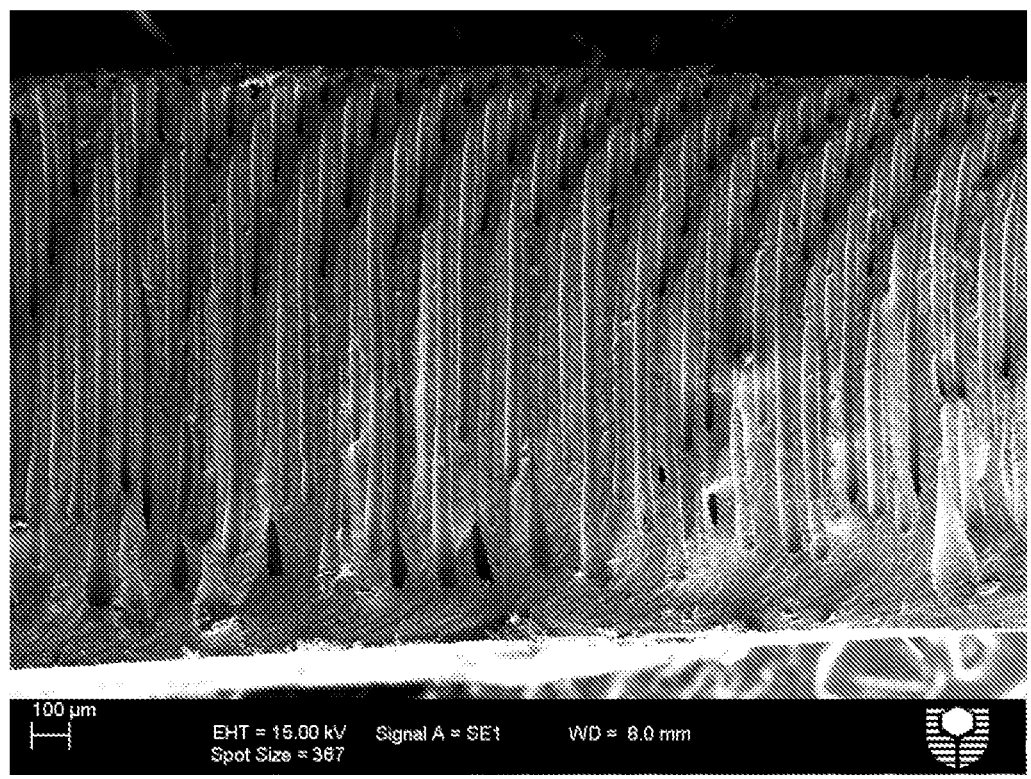
FIG. 5 shows a Scanning Electron Micrograph (SEM) image of the cross section of a membrane without a skin layer (the ceramic membrane of Example 4) according to an embodiment of the present invention. The scale bar for this figure is 100 μm.

FIG. 5 is a cross-sectional SEM image of the membrane of Example 4, which shows that the microchannels extend straight across the membrane, with a thin dense layer at one surface of the membrane. This image also shows that the microchannels retain a similar diameter throughout their length.

Example 5

Template-directed Channel Diameter

To further investigate the possibility of controlling the diameter of microchannels, a series of membranes were prepared by a similar process to that outlined in Example 1 above, with the exception that six different stainless steel meshes having different square aperture sizes were used. These ceramic membranes are referred to as the ceramic membranes of Examples 5a, 5b, 5c, 5d, 5e and 5f, which were prepared using stainless steel meshes having square aperture sizes of 35, 45, 55, 70, 100 and 150 μm, respectively.

Figure 6:
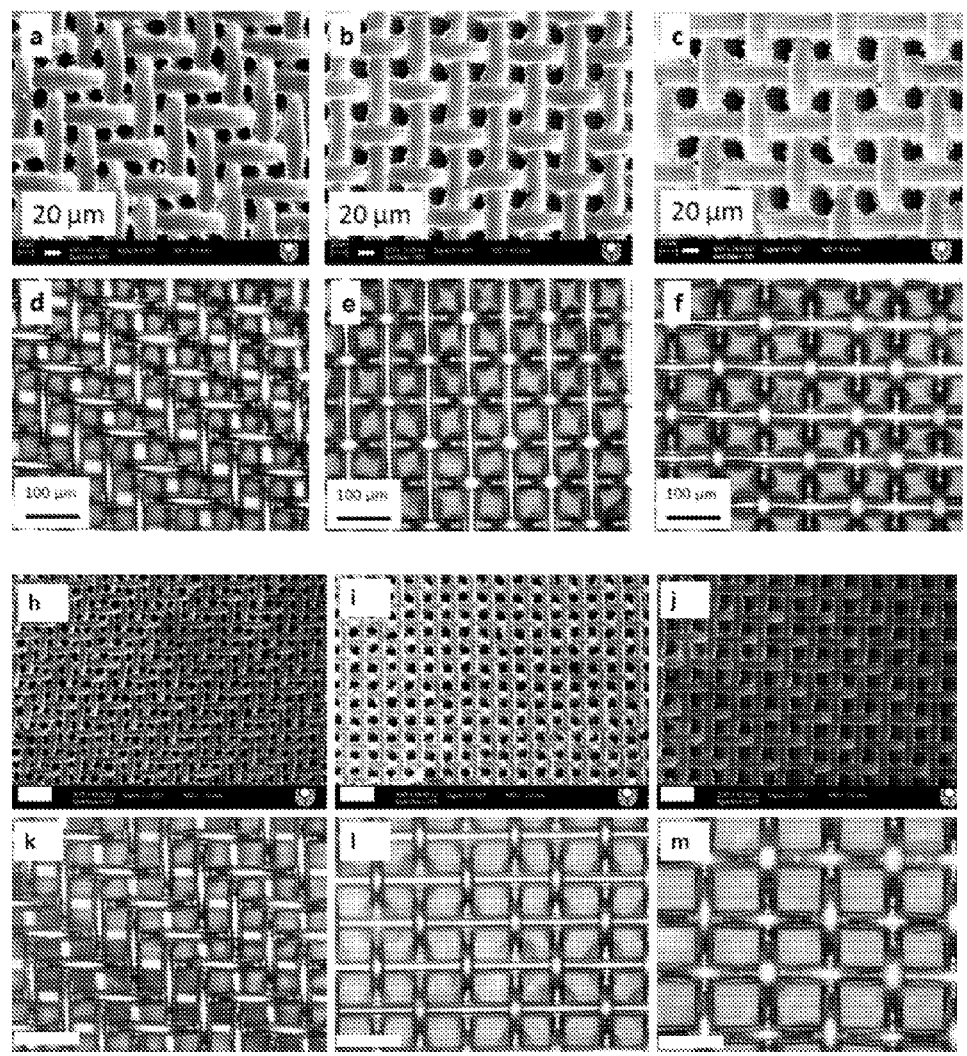
FIG. 6 shows a Scanning Electron Micrograph (SEM) image of the membrane templated by meshes with different aperture sizes (FIGS. 6a to 6c and FIGS. 6h to 6j), and optical microscopy images of the corresponding stainless steel meshes (FIGS. 6d to 6f and FIGS. 6k to 6m) according to embodiments of the present invention.

The ceramic membranes of Examples 5a to 5f show that the channel diameter increases as the mesh aperture size is increased. FIG. 6 shows the surface SEM images of the membranes templated by the meshes with different aperture sizes (FIGS. 6a to 6c and 6h to 6j), and optical microscopy images of the corresponding stainless steel meshes (FIGS. 6d to 6f and 6k to 6m). FIGS. 6a to 6c are shown with a 20 μm scale bar, FIGS. 6d to 6f are shown with a 100 μm scale bar and FIGS. 6h to 6m are shown with a 200 μm scale bar.

FIGS. 6a to 6c and 6h to 6j show that the ceramic membrane of Example 5a (mesh square aperture size of 35 μm as shown in FIG. 6d) has the smallest channel diameter. The channel diameter increases with the mesh square aperture size. FIG. 6j shows that the ceramic membrane of Example 5f (mesh square aperture size of 150 μm as shown in FIG. 6m) has the largest channel diameter.

However, the cross-sectional shape of the channel does not always mimic the shape of the mesh apertures. The meshes are made by weaving round stainless steel wires, and a neck of the microchannel forms on the membrane surface (as shown in FIG. 4b). Particularly for the smaller mesh aperture sizes, the surface of the membrane shows the neck parts of the microchannels and after polishing away the neck parts, uniform round pores are revealed (as shown in FIG. 4c). For larger mesh aperture sizes, the microchannels tend more towards the shape of the mesh aperture. For example, the microchannels of Example 5f (as shown in FIG. 6j) were relatively square in cross-section for at least part of their length.

Example 6

Template-directed Membrane Porosity

The porosity of the membranes of Examples 5a to 5f was tested by Archimedes' method. The open area of the stainless steel meshes have square aperture sizes of 35, 45, and 55, 70, 100 and 150 μm, and the porosities of the membranes of Examples 5a, 5b, 5c, 5d, 5e and 5f 4are shown in the Table below:

| Example | 5a | 5b | 5c | 5d | 5e | 5f |
|---|---|---|---|---|---|---|
| Aperture size | 35 μm | 45 μm | 55 μm | 70 μm | 100 μm | 150 μm |
| Open area | 27% | 31% | 40% | 38% | 37% | 36% |
| Porosity | 25.2% | 29.4% | 27.8% | 22.69% | 21.26% | 20.93% |

Example 7

Oxygen Permeation Test

Figure 7:
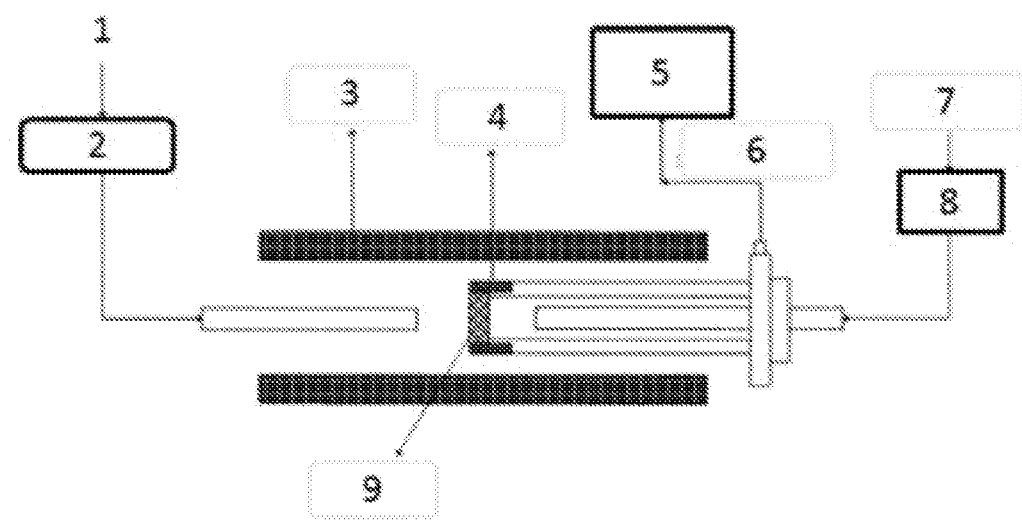
FIG. 7 is a schematic diagram showing the test set-up for the tubular furnace which was used to determine the OPF values. The numerals shown in FIG. 7 represent the following: 1 is the instrument air; 2 is a Rotameter; 3 is a Tubular furnace; 4 is a Ceramic adhesive; 5 is a GC; 6 is a Sweep gas outlet; 7 is Argon; 8 is a MFC; and 9 is an LSCF membrane.

To test oxygen permeation, the disk membrane was sealed on a quartz tube by ceramic adhesive (552-VFG, Aremco Products Inc., USA). The test was performed in a tubular furnace, and the test setup is shown in FIG. 7.

Argon was used as sweep gas and introduced by a smaller quartz tube. Air was used as feed gas on the other side of the membrane with a constant flow rate of 270 ml/min in this experiment. Oxygen concentration from the sweep gas was measured by an online gas chromatography (GC, GC-2014, Shimadzu) with a packed column of molecular sieve 5 A, and oxygen permeation flux was calculated using the following equation:

$$J_{O_2} = \frac{J_{Sweep} \, C_{O_2}}{A}$$

$J_{O_2}$ is oxygen permeation flux, $J_{sweep}$ the flow rate of sweep gas, $C_{O_2}$ is the concentration of permeated oxygen in sweep gas and A is the effective permeation area of membrane. In this experiment, the thicknesses of the ceramic membranes are between 0.80-0.85 mm.

Example 8

Results of Oxygen Permeation Studies

To demonstrate the high permeation performance of the ceramic membranes of the invention, the ceramic membrane templated by a mesh with an aperture size of 45 μm (the ceramic membrane of Example 3b) was tested. In addition, the membrane with a skin layer (the ceramic membrane of Example 2) was also tested for comparison.

Figure 8:
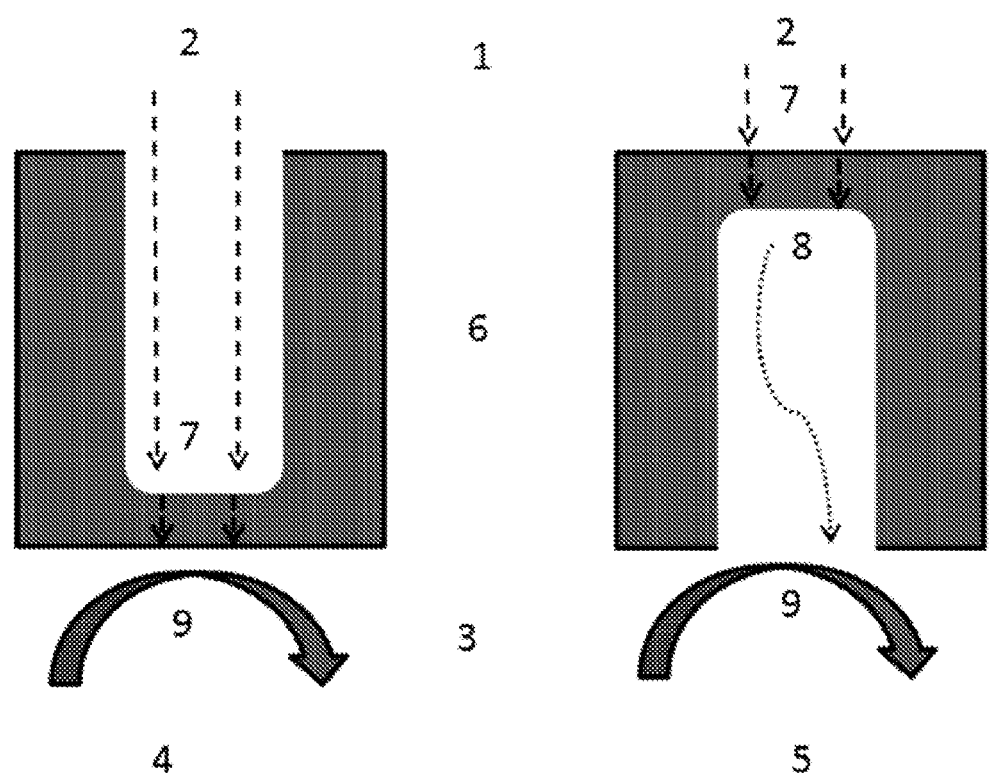
FIG. 8 is a schematic representation of different test models of oxygen permeation through the microchanneled membranes. PA, PP and PS are oxygen partial pressures in air, at the bottom of channels under SOP model and on the sweep gas side. The numerals shown in FIG. 8 represent the following: 1 is the Feed gas/air; 2 is O$_2$; 3 is the Sweep gas; 4 shows the SOD model; 5 shows the SOP model; 6 is the Membrane; 7 is P$_A$; 8 is P$_p$; 9 is P$_s$.

Oxygen exchanges on the sweep gas side and the feed gas side will make different contributions to the overall oxygen permeation process. As the ceramic membranes of the invention have an asymmetric membrane structure, the membranes were tested in two configurations (see FIG. 8):
1. The membrane was tested with the sweep gas on the dense side (SOD model); and
2. The membrane was tested with the sweep gas on the channel side (SOP model).

The oxygen permeation flux (OPF) values of the membranes with a skin layer (the ceramic membrane of Example 2) and without a skin layer (the membrane of Example 1 in the SOD and SOP configuration) were measured over the temperature range of 700-1100° C.

The oxygen permeation flux (OPF) values were also measured for the ceramic membrane of Example 4 (as described above) and a ceramic membrane which will be referred to as the ceramic membrane of Example 8. The membrane of Example 8 was prepared by a similar process to that outlined in Example 1 above, with the exception that the membrane was prepared using $SrCo_{0.8}Fe_{0.2}O_3$ (SCF) instead of LSCF-6428.

The microchanneled membrane of Example 4 has a thickness of 1.7 mm, and the OPF value was measured at 1000° C. using a sweep gas flow rate of 100 ml/min.

The microchanneled membrane of Example 8 has a thickness 0.8 mm, and the OPF value was measured at 950° C. using a sweep gas flow rate of 100 ml/min.

The results are summarised in the Table below:

| Ceramic membrane | Material and thickness | Sweep gas flow rate | OPF |
|---|---|---|---|
| Example 2 (with a skin layer) | 0.8 mm membrane made by $La_{0.6}Sr_{0.4}Co_{0.2}Fe_{0.8}O_3$ | 270 ml/min | 1.2 ml cm$^{-2}$ min$^{-1}$ at 1100° C. |
| Example 1 (without a skin layer) SOD conformation | 0.8 mm membrane made by $La_{0.6}Sr_{0.4}Co_{0.2}Fe_{0.8}O_3$ | 270 ml/min | 3.1 ml cm$^{-2}$ min$^{-1}$ at 1100° C. |
| Example 1 (without a skin layer) SOP conformation | 0.8 mm membrane made by $La_{0.6}Sr_{0.4}Co_{0.2}Fe_{0.8}O_3$ | 270 ml/min | 2.2 ml cm$^{-2}$ min$^{-1}$ at 1100° C. |
| Example 4 (without a skin layer SOD conformation) | 1.7 mm membrane made by $La_{0.6}Sr_{0.4}Co_{0.2}Fe_{0.8}O_3$ | 100 ml/min | 1.98 ml/cm$^2$ min at 1000° C. |
| Example 8 (without a skin layer SOD conformation) | 0.8 mm membrane made by $SrCo_{0.8}Fe_{0.2}O_3$ | 100 ml/min | 5.2 ml/cm$^2$ min at 950° C. |

Figure 9:
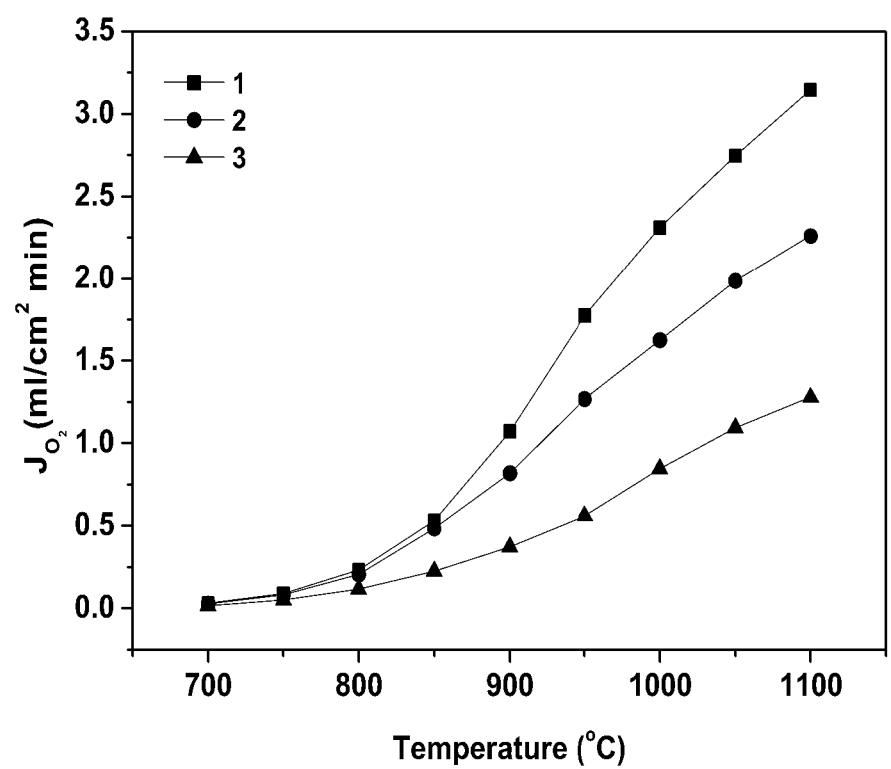
FIG. 9 is a graph showing the OPF dependence on temperature at a sweep gas flow rate 270 ml/min for microchannel-containing membranes under the SOD model and the SOP model according to an embodiment of the present invention (see Example 7 for definitions of SOD and SOP), compared with the membrane having a skin layer, over the temperature range of 700 to 1100° C. The numerals shown in FIG. 9 represent the following: 1 is the SOD model; 2 is the SOP model; 3 is a Membrane with skin layer.

The membranes without skin layers clearly produced higher OPF values than the membrane with a skin layer. For example, the membrane without a skin layer (the ceramic membrane of Example 1) shows an OPF of 3.1 ml cm$^{-2}$ min$^{-1}$ at 1100° C., which is 2.6 times that of the membrane with a skin layer, which has an OPF of 1.2 ml cm$^{-2}$ min$^{-1}$ (the ceramic membrane of Example 2). FIG. 9 shows the OPF dependence on temperature at a sweep gas flow rate 270 ml/min for microchannel-containing membranes under the SOD model and the SOP model, compared with the membrane with a skin layer over the temperature range of 700 to 1100° C. Without wishing to be bound by theory, it is believed that the oxygen permeation is controlled by a surface reaction step at low temperatures while it is determined by the combination of surface reaction and bulk diffusion at high temperatures. Compared with the membranes with a skin layer, the membrane without a skin layer possesses larger membrane surface area located within the microchannels and shorter oxygen ion bulk diffusion distance. Therefore, the high OPFs are attributed to the improved membrane microstructure.

As expected, the membrane without a skin layer showed different oxygen permeation performances when it was tested under the SOP and SOD models. The test under the SOD model showed higher OPFs than that under the SOP model, especially at high temperatures (i.e. 3.1 ml cm$^{-2}$ min$^{-1}$ for the SOD model and 2.2 ml cm$^{-2}$ min$^{-1}$ for the SOP model, respectively at 1100° C.). According to Wagner's equation, oxygen permeation is determined by the oxygen partial pressure difference between the two sides of the membrane. The test under the SOP model has a lower oxygen partial pressure difference than the test under the SOD model due to the diffusion resistance of molecular oxygen within microchannels on the sweep gas side (see FIG. 8).

Figure 10:
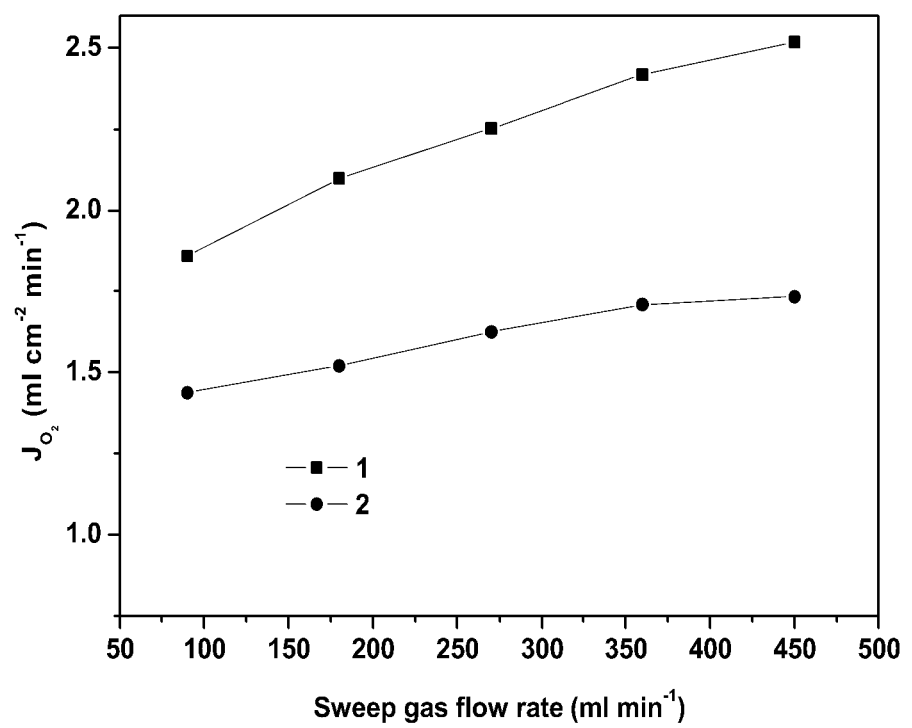
FIG. 10 is a graph showing the effect of sweep gas flow rate on oxygen permeation at 1000° C. tested under the SOP model and SOD model over microchanneled membranes according to an embodiment of the present invention (see Example 7 for definitions of SOD and SOP). The numerals shown in FIG. 10 represent the following: 1 is the SOD model; 2 is the SOP model.

The gas diffusion effect can also be observed from the influence of the sweep gas flow rate on the OPF (see FIG. 10). The OPF of the test under the SOD model kept increasing with the flow rate of the sweep gas even at 450 ml/min, because increasing the flow rate of the sweep gas can effectively reduce the oxygen partial pressure on the sweep gas side of the membrane. On the contrary, the OPF of the test under the SOP model increases only slightly with gas flow rate and becomes stable when the sweep gas flow rate reaches 360 ml/min. Therefore, the oxygen permeation process under the SOP model can be concluded to be limited by oxygen diffusion within microchannels.

Figure 11:
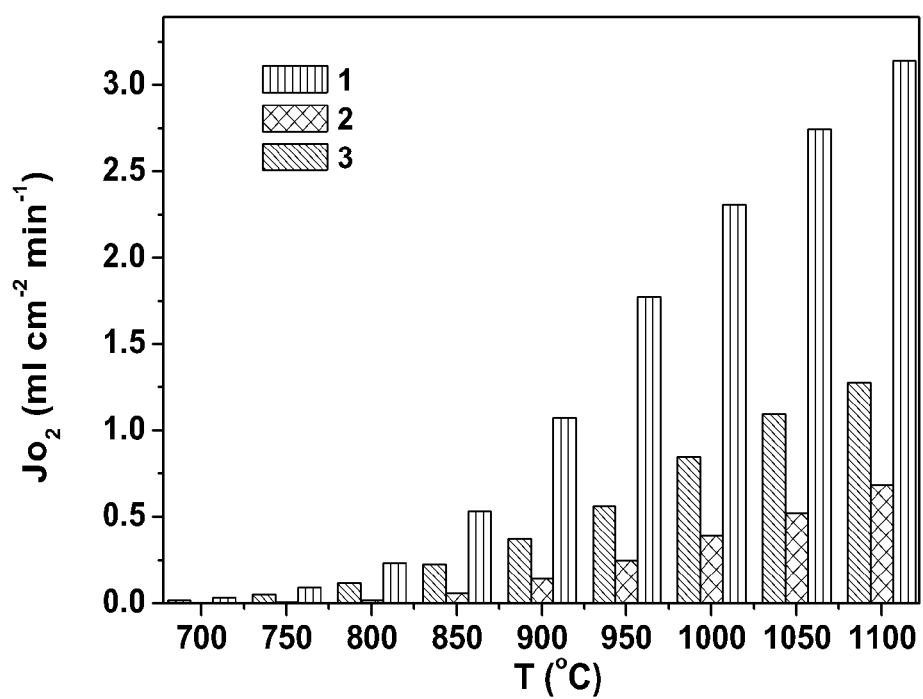
FIG. 11 is a graph showing the OPF comparisons of a membrane according to an embodiment of the present invention compared with the membrane having a skin layer; and a comparison disc membrane consisting entirely of a dense layer (having a thickness of about 0.8 mm). The numerals shown in FIG. 11 represent the following: 1 is the microchanneled membrane; 2 is a conventional dense membrane; 3 is a membrane with a skin layer.

For comparison of the new membranes and conventional dense membranes, disk membranes were prepared by pressing the same LSCF powders and sintering at the same temperature, resulting in the almost dense membranes with the same thickness as the microchanneled membranes. The OPF of the new membrane is above 5 times of that of the disk membrane at all testing temperatures (FIG. 11). It has also been found that the membrane with a skin layer showed higher OPFs than the dense membrane. This indicates the extra surface reaction processes in the membrane with a skin layer compete well with the long bulk diffusion distance of the dense membrane in the achievement of high OPFs.

Figure 12A:
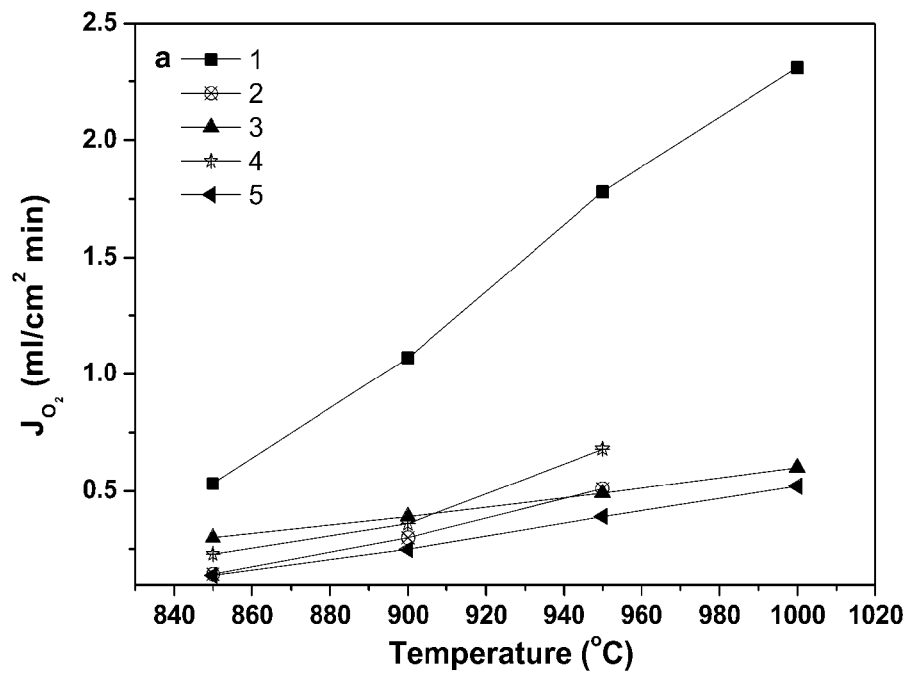
FIG. 12a is a graph showing the OPF comparisons of the membrane according to an embodiment of the present invention (labelled NM) with conventional disc membranes (DM). DM1 is the disc membrane of Zou, Y. et al. *J. Eur. Ceram. Soc.*, 2011, 31, 2931-2938, DM2 is the disc membrane of Asadi, A. A. et al., *Ind. Eng. Chem. Res.*, 2012, 51, 3069-3080, and DM3 is the disc membrane of Zeng, P. Y. et al., *J. Membr. Sci.*, 2007, 302, 171-179. DM4 refers to a conventional disc membrane made of the same material used in NM as shown in FIG. 11. The numerals shown in FIG. 12a represent the following: 1 is NM in this study, 800 μm; 2 is DM1, 900 μm; 3 is DM2, 1000 μm; 4 is DM3, 1000 μm; 5 is DM4 in this study, 800 μm.
Figure 12B:
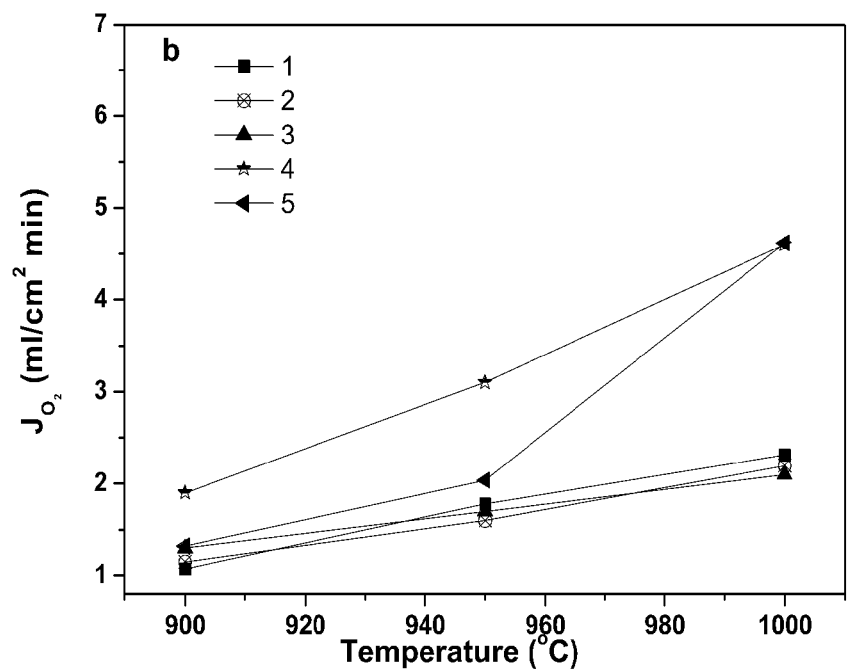
FIG. 12b is a graph showing the OPF comparisons of the membrane according to an embodiment of the present invention (labelled NM) with conventional hollow fibre membranes (HFM). HFM4 is the hollow fibre membrane of Tan, X. Y. et al. hid. Eng. Chem. Res., 2010, 49, 2895-2901, HFM5 is the hollow fibre membrane of Wang, Z. G. et al. *J. Membr. Sci.*, 2009, 345, 65-73, HFM6 is the hollow fibre membrane of Liu, N. et al. *Sep. Purif. Technol.*, 2011, 80, 396-401, and HFM7 is the hollow fibre membrane of Zydorczak, B. et al. *Chem. Eng. Sci.*, 2009, 64, 4383-4388. The numerals shown in FIG. 12b represent the following: 1 is NM in this study, 800 µm; 2 is HFM4, 300 µm; 3 is HFM5, 220 µm; 4 is HFM6, 200 µm; 5 is HFM7, 90 µm.

For the same membrane material, the microchannel-containing membrane demonstrated much higher OPFs than those reported for conventional disk membranes (see FIG. 12a). The oxygen permeation performances of the microchannel-containing membranes are comparable with that of hollow fibre membranes with wall thicknesses of 250-300 µm (FIG. 12b).

The microchanneled membrane of Example 4 was made using $La_{0.6}Sr_{0.4}Co_{0.2}Fe_{0.8}O_3$ instead of LSCF-6428 which was used to prepare the membrane of Example 1. The membrane of Example 4 showed an OPF value of 1.98 ml/cm$^2$ min at 950° C.

The microchanneled membrane of Example 8 was made of a different membrane material; $SrCo_{0.8}Fe_{0.2}O_3$ (SCF) instead of LSCF-6428 which was used to prepare the membrane of Example 1. The membrane of Example 8 showed an OPF value of 5.2 ml/cm$^2$ min at 950° C., which was higher than the OPF values obtained for the ceramic membrane of Example 1 (i.e. 3.1 ml cm$^{-2}$ min$^{-1}$ for the SOD model and 2.2 ml cm$^{-2}$ min$^{-1}$ for the SOP model, respectively at 1100° C.).

Example 9

The Effect of Slurry Composition on Article Channel Structure and Oxygen Permeation Slurry composition parameters such as the polymer concentration and solids loading (ceramic power concentration) affect the article microstructure as a result of the changes they induce in slurry viscosity. For example, a lower viscosity results in long and uniform channels and therefore, a higher oxygen permeation flux.

The optimized structure of $La_{0.6}Sr_{0.4}Co_{0.2}Fe_{0.8}O_3$ (LSCF) articles was produced using a similar process to that outlined in Example 1, with the exception that a slurry having a 60 wt % solid loading (or 60 wt % LSCF) and 20 wt % polymer concentration. This ceramic article will be referred to as the ceramic article of Example 9.

The membrane of Example 9 resulted in an oxygen permeation flux of 4.0 ml/cm$^2$ min at 1050° C. with a sweep gas flow rate of 270 ml/min.

Example 10

Dual Phase Membranes

The dual-phase microchanneled membranes were prepared as the procedure in Example 1 using 0.3 g of polyvinylpyrrolidone (PVP, molecular weight=40,000, Sigma-Aldrich, Australia), 2.8 g of polyethersulfone (PESF, Radel-A300, Sigma-Aldrich, Australia) and 14.7 g of 1-methyl-2-pyrrolidinone (NMP, 99%, Acros organics), which were mixed in a beaker to achieve a homogeneous solution. The prepared solution was mixed with 30 g of the well-mixed powder with the GDC volume ratio of 67% and the LSCF volume ratio of 33% and then ball milled for 48 hours to make a slurry. Microchanneled membranes with a thickness of about 0.8 mm were prepared by using a stainless steel mesh to template the phase inversion process, and the formed membrane green bodies were sintered at 1400° C. for 2 hours in the box furnace.

The dual-phase membrane achieved an oxygen flux of 2.2 ml cm$^{-2}$ min$^{-1}$ at 950° C. compared with pure LSCF membranes.

Figure 13:
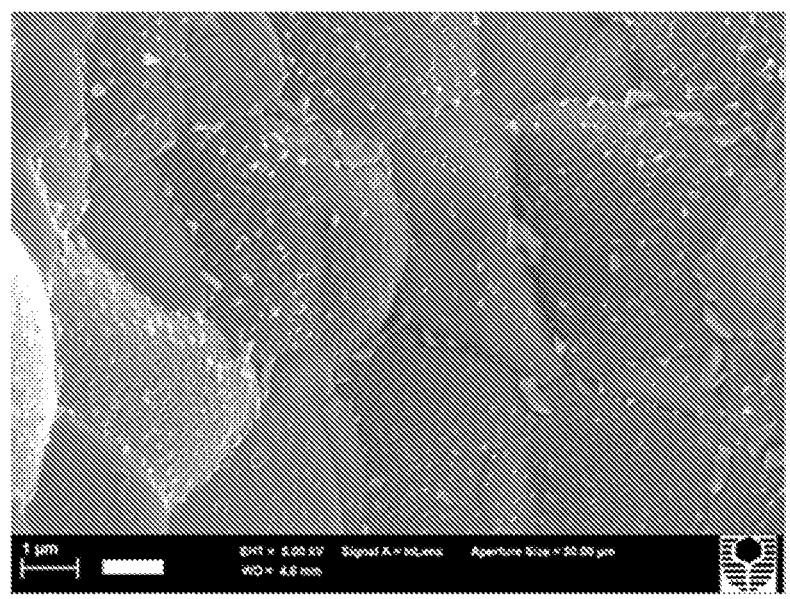
FIG. 13 is an SEM image of the surface of the microchannels within a dual phase membrane with catalyst coatings. The scale bars are 1 µm.

Platinum catalyst was coated on the surface of microchannels using a polymer hydrogel-assisted process. 10 g of acrylamide monomer, 0.5 g of 1-N,N-methylenebisacrylamide (as a cross linker) and 0.04 g of ammonium persulfate (as an initiator of polymerization) were dissolved in 42 g of deionized water. 0.3 g of platinum chloride was dissolved into the above solution to form 0.05 Pt mol L$^{-1}$ catalyst precursor. The ceramic membranes were immersed into the catalyst precursor, followed by vacuuming and heating in an oven set at 55° C. for 1 hour to perform monomer polymerization. The membranes were finally taken out from the catalyst hydrogel. After cleaning the catalyst hydrogel on the dense surface of the membrane using tissue and water for coating catalyst in the next step, the membrane with the catalyst precursor in the microchannels was heated at 950° C. for 3 hours. The SEM image of the Pt catalyst on the surface of microchannels was shown in FIG. 13. The dual-phase membranes with Pt catalyst on both sides of membranes achieved an oxygen flux of 3.8 ml cm$^{-2}$ min$^{-1}$ at 950° C.

Example 11

Supporting Electrodes for a SOFC and a SOEC

The channeled NiO/Gd$_2$O$_3$-stabilized CeO$_2$ (GDC) articles are used as a porous anode of SOFC and a porous cathode of SOEC to facilitate gas diffusion with the supporting electrodes.

11.1 Supporting Electrodes for an SOFC

The channeled ceramic porous anode was prepared by phase inversion of a ceramic slurry, followed by sintering.

The ceramic slurry was prepared by dissolving 1.87 g of Polyethersulfone (PESF, Radel A-300) and 0.21 g of Polyvinylpyrrolidone (PVP, MW=40000) in 11 g of 1-Methyl-2-pyrrolidinone (NMP, 99%) in a beaker by magnetic stirring. PESF, PVP and NMP were purchased from Sigma-Aldrich, Australia. 30 g of NiO/Gd$_2$O$_3$-stabilized CeO$_2$ (GDC) (Fuel Cell Materials, USA) with a surface area of 5.0 cm$^2$/g was mixed with the above solution in a Teflon jar. The mixture was ball milled for 48 hours by a ball-miller (MTI Corporation, USA) at a speed of 300 RPM to form homogeneous slurry.

0.4-1 ml prepared slurry was added into an aluminium mould by a syringe, after degassing. A stainless steel mesh template was then immersed just below the surface of the slurry. Tap water was poured on top of slurry, and phase inversion was conducted over a 20 minute period.

After phase inversion, the stainless steel mesh was gently removed from the solidified article together with the surface of the solidified slurry (also referred to as the skin layer) to expose the openings of the channels that formed during phase inversion. After drying at 80° C. for 60 min, the membrane was heated in a box furnace (ModuTemp Pty. Ltd., Australia) at 600° C. to remove organic components and then sintered at 1350° C. for 5 hours.

The SOFC was assembled using $Sc_2O_3$-stabilized $ZrO_2$ (SSZ) as the electrolyte and $Ba_{0.5}Sr_{0.5}Co_{0.2}Fe_{0.8}O_{3-\delta}$/GDC as a cathode.

11.2 Supporting Electrodes for an SOEC

The channeled ceramic porous cathode was prepared by phase inversion of a ceramic slurry, followed by sintering.

The ceramic slurry was prepared by dissolving 1.87 g of Polyethersulfone (PESF, Radel A-300) and 0.21 g of Polyvinylpyrrolidone (PVP, MW=40000) in 11 g of 1-Methyl-2-pyrrolidinone (NMP, 99%) in a beaker by magnetic stirring. PESF, PVP and NMP were purchased from Sigma-Aldrich, Australia. 30 g of NiO/$Gd_2O_3$-stabilized $CeO_2$ (GDC) (Fuel Cell Materials, USA) with a surface area of 5.0 $cm^2$/g was mixed with the above solution in a Teflon jar. The mixture was ball milled for 48 hours by a ball-miller (MTI Corporation, USA) at a speed of 300 RPM to form homogeneous slurry.

0.4-1 ml prepared slurry was added into an aluminium mould by a syringe, after degassing. A stainless steel mesh template was then immersed just below the surface of the slurry. Tap water was poured on top of slurry, and phase inversion was conducted over a 20 minute period.

After phase inversion, the stainless steel mesh was gently removed from the solidified article together with the surface of the solidified slurry (also referred to as the skin layer) to expose the openings of the channels that formed during phase inversion. After drying at 80° C. for 60 min, the membrane was heated in a box furnace (ModuTemp Pty. Ltd., Australia) at 600° C. to remove organic components and then sintered at 1350° C. for 5 hours.

The SOEC was assembled using $Sc_2O_3$-stabilized $ZrO_2$ (SSZ) as the electrolyte and $La_{0.6}Sr_{0.4}Co_{0.2}Fe_{0.8}O_{3-\delta}$/GDC as an anode.

Example 12

Power-driven Oxygen Pump

The channeled ceramic membrane was prepared by phase inversion of a ceramic slurry, followed by sintering.

The ceramic slurry was prepared by dissolving 2.37 g of Polyethersulfone (PESF, Radel A-300) and 0.21 g of Polyvinylpyrrolidone (PVP, MW=40000) in 13.93 g of 1-Methyl-2-pyrrolidinone (NMP, 99%) in a beaker by magnetic stirring. PESF, PVP and NMP were purchased from Sigma-Aldrich, Australia. 30 g of $Ba_{0.5}Sr_{0.5}Co_{0.8}Fe_{0.2}O_3$ (Praxair, USA) with a surface area of 1.4 $cm^2$/g was mixed with the above solution in a Teflon jar. The mixture was ball milled for 48 hours by a ball-miller (MTI Corporation, USA) at a speed of 300 RPM to form homogeneous slurry.

0.4-1 ml prepared slurry was added into an aluminium mould by a syringe, after degassing. A stainless steel mesh template was then immersed just below the surface of the slurry. Tap water was poured on top of slurry, and phase inversion was conducted over a 20 minute period.

After phase inversion, the stainless steel mesh was gently removed from the solidified article together with the surface of the solidified slurry (also referred to as the skin layer) to expose the openings of the channels that formed during phase inversion. After drying at 80° C. for 60 min, the membrane was heated in a box furnace (ModuTemp Pty. Ltd., Australia) at 600° C. to remove organic components and then sintered at 1350° C. for 5 hours.

Figure 14:
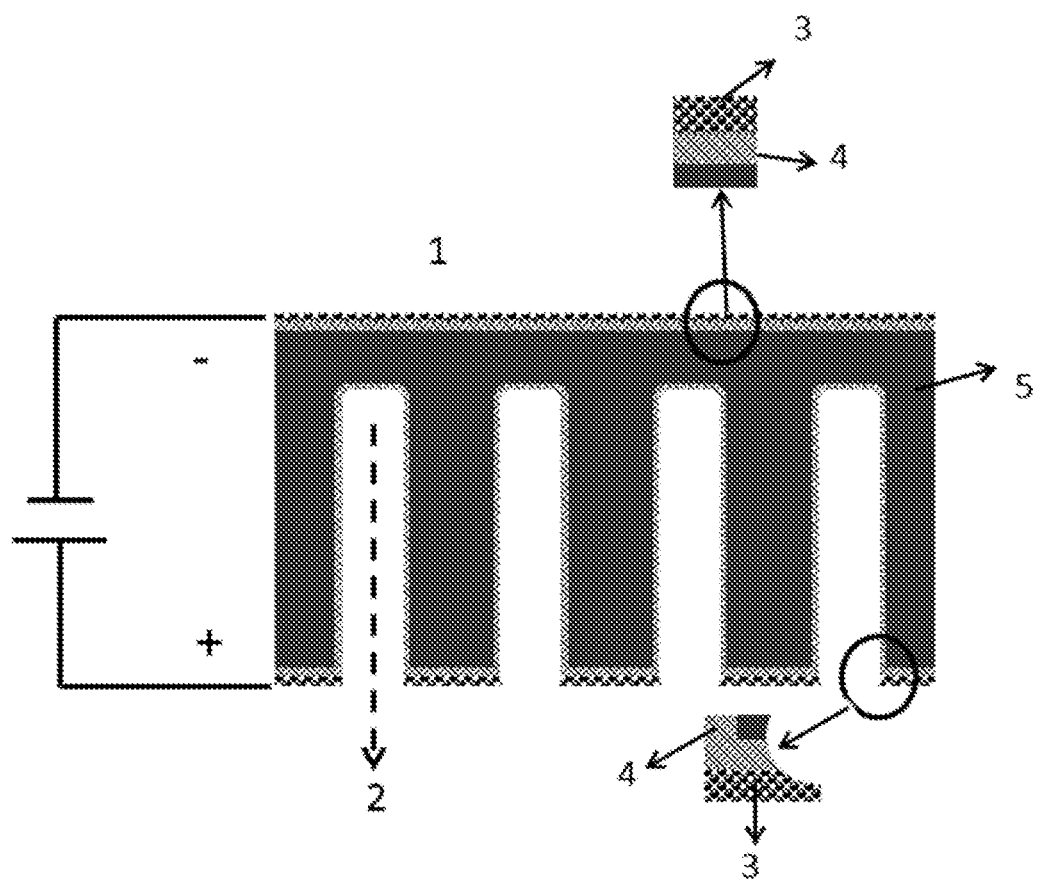
FIG. 14 is a schematic diagram showing the configuration of the test set-up of an oxygen pump. The numerals shown in FIG. 11 represent the following: 1 is Air; 2 is $O_2$; 3 is a porous current collector; 4 is a porous electrode; 5 is a dense electrolyte.

A voltage of 6.7V was applied to the Gd-doped ceria microchanneled membrane, and a current of 4 A was measured. With the membrane inside a furnace operating at 600° C., the temperature of the membrane was measured at 750° C. The observed oxygen permeation flux was 17.66 ml/$cm^2$ min The configuration of the test set-up of the oxygen pump is shown in FIG. 14.

Example 13

Natural Gas Conversion

The channeled ceramic membrane was prepared by phase inversion of a ceramic slurry, followed by sintering.

The ceramic slurry was prepared by dissolving 2.37 g of Polyethersulfone (PESF, Radel A-300) and 0.21 g of Polyvinylpyrrolidone (PVP, MW=40000) in 13.93 g of 1-Methyl-2-pyrrolidinone (NMP, 99%) in a beaker by magnetic stirring. PESF, PVP and NMP were purchased from Sigma-Aldrich, Australia. 30 g of $Ba_{0.5}Sr_{0.5}Co_{0.8}Fe_{0.2}O_3$ (Praxair, USA) with a surface area of 1.4 $cm^2$/g was mixed with the above solution in a Teflon jar. The mixture was ball milled for 48 hours by a ball-miller (MTI Corporation, USA) at a speed of 300 RPM to form homogeneous slurry.

0.4-1 ml prepared slurry was added into an aluminium mould by a syringe, after degassing. A stainless steel mesh template was then immersed just below the surface of the slurry. Tap water was poured on top of slurry, and phase inversion was conducted over a 20 minute period.

After phase inversion, the stainless steel mesh was gently removed from the solidified article together with the surface of the solidified slurry (also referred to as the skin layer) to expose the openings of the channels that formed during phase inversion. After drying at 80° C. for 60 min, the membrane was heated in a box furnace (ModuTemp Pty. Ltd., Australia) at 600° C. to remove organic components and then sintered at 1050° C. for 5 hours.

The resulting 0.8 mm thick membrane containing $Ba_{0.5}Sr_{0.5}Co_{0.8}Fe_{0.2}O_3$ as the ceramic material achieved an oxygen flux of 11.29 ml/$cm^2$ min at 1000° C. using 400 ml/min sweep gas. When the same membrane was used to conduct $CH_4$ partial oxidation reactions (at 875° C. using a cerium supported nickel fibrous catalyst bed), the oxygen permeation flux achieved was 24 ml/min. The feed gas flow rate was 95 ml/min and contained 21% $CH_4$ in argon. 100 ml/min air was applied at the oxygen rich side. $CH_4$ conversion was 70%, CO selectivity was 90%.

The invention claimed is:

1. A method of manufacturing an article containing spaced channels comprising:
   bringing a template having spaced openings into contact with a solution comprising a first solvent and a polymer that is soluble in the first solvent; and,
   introducing a second solvent into the solution through the openings of the template to cause phase inversion of the solution and to form an article containing spaced channels extending from a surface of the article into a body of the article.

2. The method according to claim 1, wherein the solution further comprises a particulate material suspended in the solution.

3. The method according to claim 1, wherein the solution further comprises polyvinylpyrrolidone, polyethylene glycol, prionic acid or a surfactant.

4. The method according to claim 1, wherein:
the solution further comprises a ceramic material to form a ceramic slurry;
the second solvent is an antisolvent; and
the method forms a ceramic article containing spaced channels extending from a surface of the ceramic article into a body of the ceramic article.

5. The method according to claim 4, further comprising locating the template below a surface of the ceramic slurry.

6. The method according to claim 1, further comprising removing the template after phase inversion.

7. The method according to claim 1, further comprising terminating the channels within the body of the article to form channels closed at one end.

8. The method according to claim 1, wherein the method further comprises subjecting the article to a heat treatment comprising drying, heating, curing or sintering the article.

9. The method according to claim 4, wherein the ceramic slurry comprises a particulate ceramic material, an antisolvent insoluble polymer, and an antisolvent miscible solvent.

10. The method according to claim 9, wherein the particulate ceramic material is a perovskite, a fluorite, a beta alumina ceramic, or a mixture thereof.

11. The method according to claim 10, wherein the particulate ceramic material is a mixture of a perovskite and a fluorite.

12. The method of claim 11, wherein the particulate ceramic material is a mixture of $La_{0.6}Sr_{0.4}Co_{0.2}Fe_{0.8}O_{3-\delta}$ (LSCF) and $Ce_{0.8}Gd_{0.2}O_{2-\delta}$ (GDC), wherein $\delta$ is a number determined by the valence of metals in the ceramic material.

13. The method according to claim 9, wherein the particulate ceramic material is selected from the group consisting of $La_{0.6}Sr_{0.4}Co_{0.2}Fe_{0.8}O_{3-\delta}$ (LCSF-6428), $SrCo_{0.8}Fe_{0.2}O_3$ (SCF), $BaZr_{0.8}Y_{0.2}O_{3-\delta}$ (BZY), $La_{1-x}Ca_xFeO_3$, $BaCeO_3$, $BaZrO_3$, $Ba_{0.5}Sr_{0.5}Co_{0.8}Fe_{0.2}O_{3-\delta}$, $Ba_{0.5}Sr_{0.5}Co_{0.2}Fe_{0.8}O_{3-\delta}$, $Ba_{0.95}La_{0.05}FeO_{3-\delta}$, $SrCo_{0.2}Fe_{0.8}O_{3-\delta}$, $SrSc_{0.05}Co_{0.05}O_{3-\delta}$, $PrBaCo_2O_{5+\delta}$, $Y_{1-x}Ca_xBaCo_4O_{7+\delta}$, $Y_2O_3$-stabilized $ZrO_2$, $Sc_2O_3$-stabilized $ZrO_2$, $Sm_2O_3$ stabilized $CeO_2$, $Gd_2O_3$-stabilized $CeO_2$, $Ce_{0.8}Gd_{0.2}O_{2-\delta}$ (GDC), NiO/$Gd_2O_3$-stabilized $CeO_2$ (GDC), non-stoichiometric $Na_2O.Al_2O_3$, $Na_2O.11Al_2O_3$ (β), $Na_2O5.33Al_2O_3$ (β''), $Al_2O_3$, $Na_{0.5}Bi_{0.5}TiO_3$, $Bi_2V_{0.9}Cu_{0.1}O_{5.35}$, $Sr_{1.65}Na_{1.35}Si_3O_{8.325}$ or a mixture thereof, wherein x is from 0 to 1.0, except for $La_{1-x}Ca_xFeO_3$ where x is 0-0.5, and $\delta$ is a number determined by the valence of metals in the ceramic material.

14. The method according to claim 9, wherein the antisolvent insoluble polymer is selected from the group consisting of polyethersulfone, ethylene-vinyl alcohol, cellulose acetate, polysulfone, polyacrylonitrile, cellulosics, polyvinylidone fluoride, polyimides (PI) and polyamides (PA) and mixtures thereof.

15. The method according to claim 9, wherein the antisolvent miscible solvent is an organic solvent selected from the group consisting of 1-methyl-2-pyrrolidinone acetone, dimethylsulfoxide, dimethyl formamide, tetrahydrofuran, dimethylacetamine, formyl piperidene, dioxane, acetic acid, morpholine or a mixture of two or more thereof.

16. The method according to claim 4, wherein the antisolvent is water, ethanol, isopropanol, glycol or a mixture of two or more thereof.

17. The method according to claim 4, wherein the solution further comprises polyvinylpyrrolidone, polyethylene glycol, prionic acid or a surfactant.

18. An article manufactured by the method of claim 1.

19. The article according to claim 18, wherein the article is a membrane.

20. A gas separation membrane comprising a ceramic membrane prepared by a method comprising:
bringing a template having spaced openings into contact with a ceramic slurry; and
introducing an antisolvent into the ceramic slurry through the openings of the template to cause phase inversion of the ceramic slurry and to form a ceramic membrane containing spaced channels extending from a surface of the ceramic membrane into a body of the ceramic membrane.

* * * * *